US009081100B1

(12) United States Patent
Bellinger et al.

(10) Patent No.: US 9,081,100 B1
(45) Date of Patent: Jul. 14, 2015

(54) APPARATUS AND METHOD FOR DETERMINATION OF ONE OR MORE FREE NEUTRON CHARACTERISTICS

(71) Applicant: The Curators of the University of Missouri, Columbia, MN (US)

(72) Inventors: Steven L. Bellinger, Manhattan, KS (US); Anthony N. Caruso, Overland Park, KS (US); Brian Cooper, Manhattan, KS (US); William L. Dunn, Manhattan, KS (US); Ryan G. Fronk, Manhattan, KS (US); Douglas S. McGregor, Riley, KS (US); William H. Miller, Rocheport, MO (US); Eliot R. Myers, Kansas City, MO (US); Thomas M. Oakes, Albuquerque, NM (US); Philip B. Ugorowski, Manhattan, KS (US); John K. Shultis, Manhattan, KS (US); Timothy J. Sobering, Manhattan, KS (US); Cory B. Hoshor, Kansas City, MO (US)

(73) Assignees: The Curator of the University of Missouri, Columbia, MO (US); Kansas State University Research Foundation, Manhattan, KS (US)

( * ) Notice: Subject to any disclaimer, the term of this patent is extended or adjusted under 35 U.S.C. 154(b) by 399 days.

(21) Appl. No.: 13/694,104

(22) Filed: Oct. 29, 2012

Related U.S. Application Data

(60) Provisional application No. 61/198,413, filed on Oct. 27, 2011.

(51) Int. Cl.
*G01T 3/08* (2006.01)

(52) U.S. Cl.
CPC ............................... *G01T 3/08* (2013.01)

(58) Field of Classification Search
CPC ............................................. G01T 3/08
USPC ............................................. 250/392
See application file for complete search history.

(56) References Cited

U.S. PATENT DOCUMENTS

| 4,593,195 | A * | 6/1986 | Bienfait et al. | 250/253 |
| 2012/0223242 | A1 * | 9/2012 | Brown et al. | 250/391 |
| 2013/0048849 | A1 * | 2/2013 | Li et al. | 250/269.8 |

* cited by examiner

*Primary Examiner* — David Porta
*Assistant Examiner* — Faye Boosalis
(74) *Attorney, Agent, or Firm* — Suiter Swantz pc llo

(57) ABSTRACT

A neutron detection system may include a neutron detector including a plurality of neutron detection devices, a plurality of discrete neutron moderating elements, wherein each of the neutron moderating elements is disposed between two or more neutron detection devices, the plurality of neutron detection devices and the plurality of discrete neutron moderating elements disposed along a common axis, a control system configured to generate a detector response library, wherein the detector response library includes one or more sets of data indicative of a response of the detector to a known neutron source, receive one or more measured neutron response signals from each of the neutron devices, the one or more measured response signals response to a detected neutron event, and determine one or more characteristics of neutrons emanating from a measured neutron source by comparing the one or more measured neutron response signals to the detector response library.

24 Claims, 25 Drawing Sheets

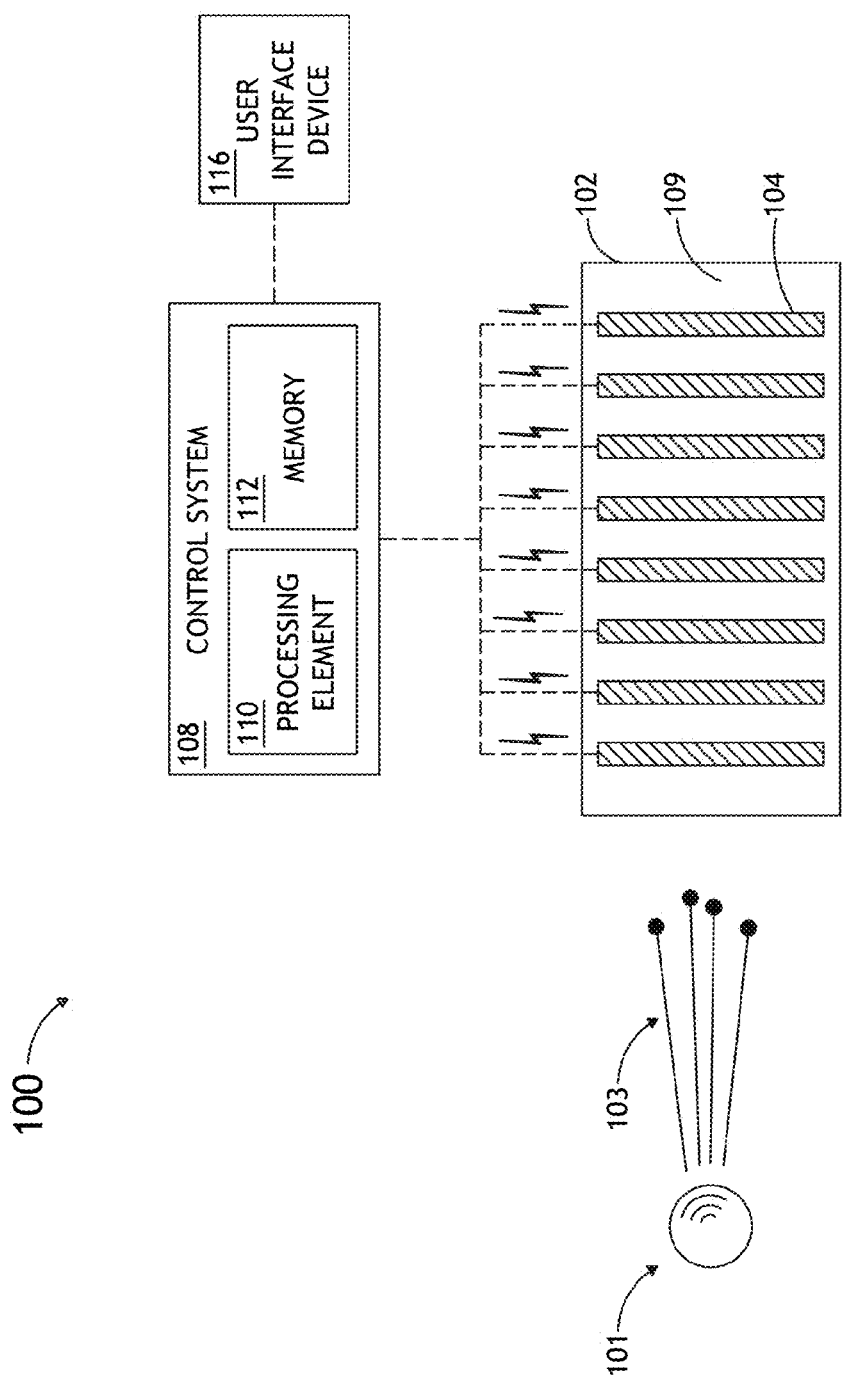

APPARATUS AND METHOD FOR DETERMINATION OF ONE OR MORE FREE NEUTRON CHARACTERISTICS

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a regular (non-provisional) patent application of United States Provisional Patent Application entitled APPARATUSES AND METHOD FOR THE IDENTIFICATION OF FREE NEUTRON PROPERTIES, naming Steven L. Bellinger et al. as inventors, filed Oct. 27, 2011, Application Ser. No. 61/198,413.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Award ONR N00014-11-1-0157, ONR N00014-11-M-0041, and DTRA-01-03-C-0051.

TECHNICAL FIELD

The present invention generally relates to a method and apparatus for neutron detection, and more particularly to a neutron detection system allowing for more efficient detection of neutrons.

BACKGROUND

Neutron detection is a challenging task due to the fact that neutrons have no distinguishing charge, in contrast to alpha particles, beta particles, or excited electrons from gamma ray interactions. Typically, neutrons are detected through nuclear reactions, such as absorption or scattering reactions. However, those nuclear reactions tend to cause energy identification of the neutrons to be lost, thereby making neutron spectroscopy difficult to realize. Several methods have been proposed to measure neutron spectra from unknown (or known, but uncalibrated) sources. Some of the methods are briefly reviewed below.

The "Bonner Sphere" detection method consists of a small neutron sensitive scintillation detector inserted in a high-density polyethylene (HDPE) ball. The system consists of a set of balls, ranging from 3 inches in diameter up to 14 inches in diameter. A measurement is made with each ball, one after the other, under identical operating conditions. From known response curves, the neutron spectrum can be back-calculated from the data through unfolding techniques. Most changes are greatest for neutrons under 1 MeV. However, for neutrons greater than 1 MeV, the neutron detection response curves for the Bonner sphere set are very similar. In addition, the mass of the spheres and the method used makes Bonner spheres impractical for fast and/or portable neutron spectroscopy.

A nuclear plate camera can be used to discern neutron energies. The system consists of a HDPE radiator fastened to the front of a vacuum cylinder or box. Fast neutrons interacting in the plastic eject recoil protons, with the most energetic protons being completely forward scattered. A film plate, set at 10 degrees from normal, is located at the end of the box. A series of collimators ensures that only forward scattered protons reach the film plate. Proton interactions in the film produce a measurable track, the length of which correlates to the forward scattered energy of the proton, and therefore the neutron energy. The film must be developed; therefore, immediate interpretation of the results is difficult or impractical.

The $^3$He device depends upon the $^3$He(n,p)$^3$H reaction, with a Q=0.764 MeV. Fast neutrons absorbed in the $^3$He gas produce energetic charged particle reaction products with total energy equal to the initial neutron energy plus 0.764 MeV, thereby allowing for the original neutron energy to be calculated. Additionally, fast neutron recoils off of the $_3$He gas produce a noticeable recoil peak at 75% of the initial neutron energy, giving a second method to check the initial neutron energy. Gas recoil detectors rely solely upon fast neutron scattering reactions; hence the devices typically use hydrogen, or a hydrogen gas mixture, or helium. The recoil peak established on a pulse height spectrum allows for the calculation of the initial neutron energy.

The proton recoil telescope system is similar to the nuclear-plate camera, except charged particle detectors are set at known angles with respect to the HDPE radiator. Hence, the energy deposited in the charged particle detector, along with the angle of incidence, yields the initial neutron energy. However, the concept relies on the fact that the initial trajectory of the fast neutron is known; hence the origin of the fast neutrons must be given.

Time of flight spectrometers rely upon the velocity and energy correlation with neutrons. A set of "choppers", slotted cylinders with variable angular velocities, are set apart by a significant distance. The rotating slots are synchronized such that neutrons of a pre-established velocity can pass through both choppers, but the second chopper will block slower or faster neutrons. A detector is located beyond the second chopper, which will detect only those neutrons that can pass through the entire apparatus. By adjusting the chopper angular velocities for each measurement, a spectrum of the neutron field can be measured provided that the direction from which the neutrons are coming is known. Typically, time of flight spectrometers tend to be relatively large and lacking portability.

Plastic scintillators rely upon (n,p) reactions to produce measurable scintillation light. The recoil protons produce scintillation light as a function of energy. The scattered neutron may lose all of its energy in a single collision, thereby giving all of its energy to the recoil proton. Alternatively, the neutron may lose its energy through a series of scatters, thereby distributing its energy to many protons. The light is measured with a photomultiplier tube, or some other light-sensing device. Some problems with plastic scintillators are: (a) their light emission spectrum is non-linear with respect to energy deposition and particle mass; (b) they are fairly insensitive for proton recoils with energy less than 1 MeV; and (c) the scintillator mass (volume) required to stop energetic neutrons is significant, hence Compton electrons excited by gamma ray interactions in the material can contribute to background noise.

The capture-gated neutron spectrometer utilizes a plastic scintillator that has been doped with $^{10}$B. Recoil reactions (n,p) occur rapidly and produce scintillation light from recoil protons with about 50 ns, which can yield the total energy of the original neutron provided that all of the neutron energy is absorbed in the scintillation block. Thermalized neutrons can diffuse to a boron site, which can take several microseconds, after which another scintillation flash will be observed from the $^{10}B(n,\alpha)^7Li$ reaction (Q=2.31 MeV). If the second flash occurs, equivalent to 2.31 MeV energy deposition, then the first flash is indicative of the original neutron energy. If a second flash does not occur, then the first flash is ignored as having been produced by partial energy deposition of the neutron. The system suffers from the non-linear light emission attributes of plastic scintillators. Furthermore, completing processes with carbon scattering in the scintillator tends to enhance the non-linear response.

Five classes of wide energy range and non-time-of-flight neutron spectrometers have emerged over time, including: (1) single detectors enclosed by multiple neutron interaction materials; (2) multiple detectors individually enclosed by different neutron interaction materials; (3) multiple detectors collectively enclosed by a single neutron interaction material; (4) single position sensitive detectors enclosed by multiple neutron interaction materials; and (5) instruments which comprise a combination of elements from the first three.

In the first class, a combination of boron and/or cadmium, lead or tungsten, and high hydrogen concentration material (usually, high density polyethylene [HDPE]) are used as filters, spallation centers, and moderators to provide ever better response up to ones of GeV incident neutron energy (e.g., Canberra's SNOOPY or Thermo's SWENDI-II). These instruments are known colloquially as the Andersson-Braun (AB) type. The downside of this approach is that the total mass is high (usually >10 kg) and the intrinsic detection efficiency is low.

In the second case, multi-band detectors usually tune three or more detectors to the thermal, epithermal, and fast neutron spectrum ranges but without extraneous moderator. The implication here is a lightweight instrument (e.g., Ludlum's PRESCILA). However, the average energy resolution over the thermal to fast range is consequently the poorest of the five methods because of severe over or under response in the bands not covered.

The third method employs many individual thermal neutron detectors in an HDPE or comparable moderating matrix to provide a depth dependent intensity of thermalized neutrons that yields both the highest efficiency and lowest average dose- and dose-rate-error of the above methods. The shortfall of these instruments is their large moderating volume (usually a 30 cm diameter sphere) needed to accommodate tens-to-hundreds of individual detectors, rendering a non-portable device (>40 lbs with electronics).

The fourth method utilizes a single position sensitive detector enclosed by moderator and filter materials as an improvement to the classical long counter. This detection scheme suffers from large moderating volumes and low intrinsic efficiency due to high neutron absorption in the moderator and/or scattering of neutrons outside the detector volume.

There are only a few examples of the fifth class which utilize a combination of elements from the first three. Like the second class, these dosimeter schemes use a superposition of responses, but they incorporate an important improvement in that the overlapping energy response bands are continuous providing for a much better dose equivalent match. The downside is again the large total volume and low intrinsic efficiency.

Passive identification and/or differentiation of spontaneous fission (e.g., $^{252}Cf$), radioisotope ($\alpha$,n) (e.g., AmBe), and/or spallation (e.g., cosmic-ray induced) neutrons sources represents a significant challenge. High total or intrinsic neutron detection efficiency over the specified energy range is important with regard to collection time and in being sensitive to the bare, filtered, and/or moderated incarnations of the above identified neutron sources. Spectroscopic resolution is important as it provides a means of deconvolving, identifying, and/or verifying known and unknown neutron sources. Portability is important with regard to man-based searches. For example, the SNOOPY NP-2 neutron REM meter currently used onboard nuclear Navy ships weighs 22 lbs. and prevents sailors from performing their job as well as they could if a lighter REM meter were made available. Direct or effective insensitivity to photons, which could swamp out or be recorded as false positive neutrons, is especially prudent given the ease through which gamma emitters naturally exist, are omni-present with any neutron source, and can intentionally be placed as a red herring by those wishing to thwart neutron presence and properties. Determination of absolute neutron flux is useful toward verification of source strength and in displaying the real-time ambient neutron dose equivalent. Ambient neutron dose equivalent is an important measure of absorbed dose, weighted for the energy(ies) of the absorbed neutron(s). Some real-time portable REM meters yield incredible error, especially in the epithermal neutron energy range. Given not only the dearth of $^3He$, but the flux and spectral variance of neutrons and photons, there exists a need for neutron sensitive instruments that cure at least some of the foregoing deficiencies and enable performance attributes desired in the art.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

Referring generally to FIGS. 1A through 14F, a neutron detection system 100 suitable for determination of one or more free neutron characteristics is described in accordance with the present disclosure. The present invention is directed to a low-power high-efficiency semiconductor thermal-neutron detector disposed within a neutron moderating volume. The present invention is further directed to a portable neutron detector unit (e.g., hand-held unit, shoulder carried unit, or the like) and may be powered utilizing battery power. In a further aspect, the neutron detection system 100 of the present invention is suitable for performing neutron energy spectroscopy or measuring quantities correlatable to neutron energy, allowing for the determination of various neutron energy characteristics, such as, but not limited to, neutron source type and neutron dose. The spectroscopic abilities of the detector 102 of the present invention allow for the discernment of various neutron sources, such as spontaneous neutron emitters (e.g., Cf), ($\alpha$,n) emitters (e.g., Am—Be, Pu—Be, and the like), spallation neutron emitters, fusion-based neutron emissions (DD, DT, TT, etc.) and photoneutron ($\gamma$,n) sources (e.g., Sb—Be). In addition, the detection system 100 is suitable for detecting incident neutrons as a function of directional incidence, allowing the detection system 100 to effectively act as a directional sensor. In this regard, the detection system of the present invention is commonly referred to herein as a neutron detector as well as a neutron spectrometer.

Figure 1B:
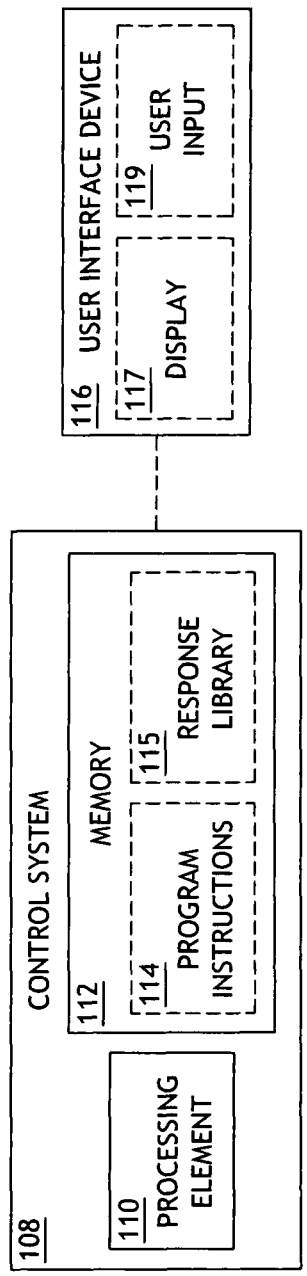
FIG. 1A through 14F illustrate various embodiments of the system for determining one or more free neutron characteristics, in accordance with the present invention.

FIGS. 1A-1B illustrate a high-level block diagram of the neutron detection system 100, in accordance with one embodiment of the present invention. In one aspect of the present invention, the neutron detection system 100 includes one or more neutron detectors 102. In a further aspect, the one or more detectors 102 may include, but are not limited to, a plurality of neutron detection devices 104. In another aspect of the present invention, the neutron detection system 100 includes a control system 108 communicatively coupled to an output of each of the neutron detection devices 104, or coupled to an output of the detection elements 105 of each device 104, of the one or more detectors 102. Additionally, the control system 108 may include one or more processing elements 110 (e.g., computer processor, FPGAs, ASICs, and the like). Further, the control system 108 may include, but is not limited to, a non-transitory storage medium 112 (i.e., memory medium) containing program instructions configured to cause the one or more processing elements 110 to carry out one or more of the various steps (e.g., system control steps, data analysis steps, and the like) described through the present disclosure.

In another aspect of the present invention, the one or more processing elements 110 of the control system 108 are configured to: receive one or more output signals from the one or more neutron detection devices 104 of the one or more detectors 102 and determine (e.g., determine in real-time, near real-time, or delayed time) one or more characteristics (e.g., energy, energy spectrum, neutron source type, direction of neutron emanation, dose, flux, and the like) of neutrons 103 (e.g., neutron emanating from neutron source 101) impinging on the one or more detection devices 104. In a further aspect of the present invention, the control system 108 may be communicatively coupled to a user interface device 116 (e.g., display device 117 and user input 119).

Figure 1C:
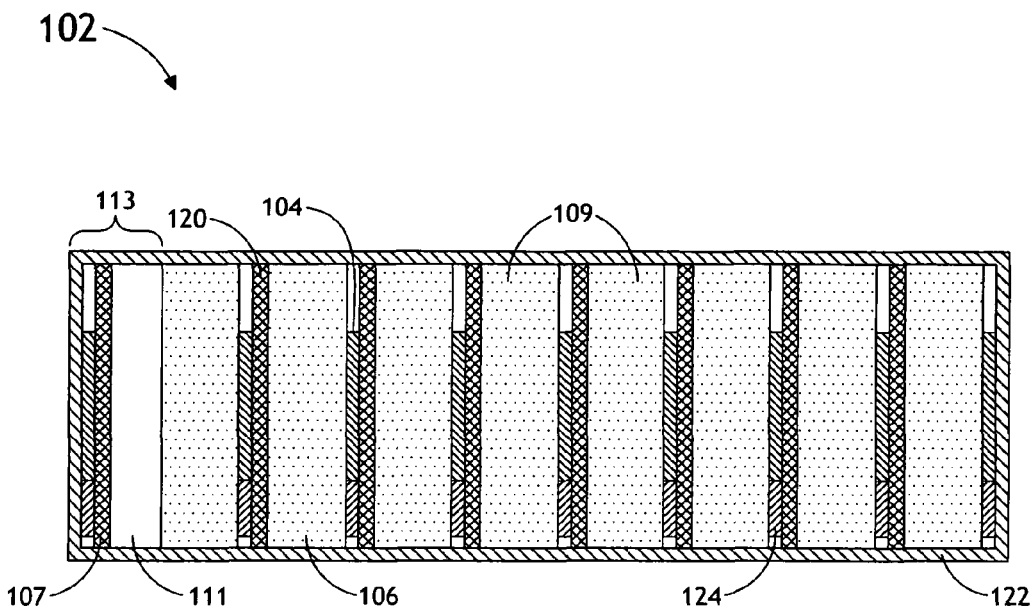
Figure 1D:
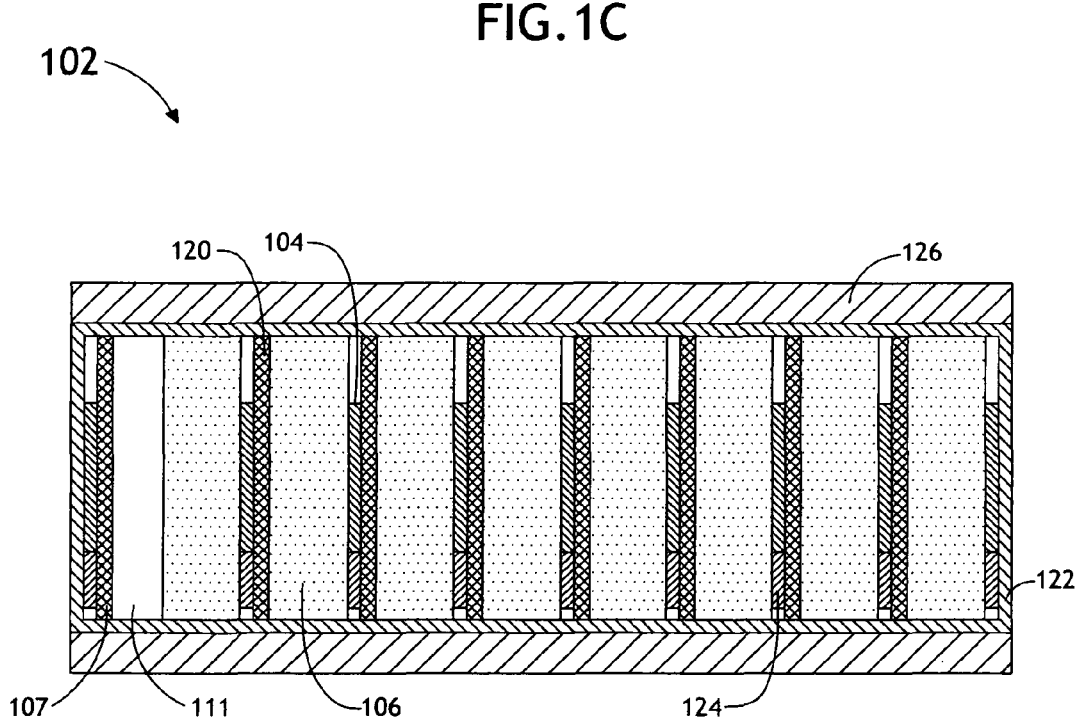
Figure 1E:
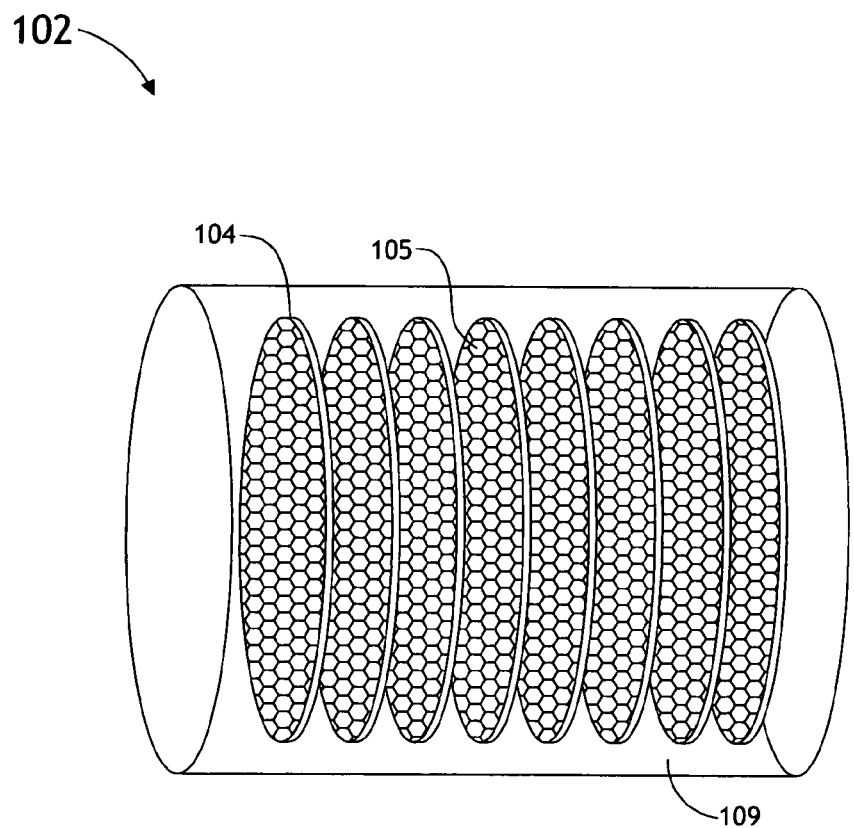

FIGS. 1C-1E illustrate a schematic view of a neutron detector 102 of the detection system 100, in accordance with one embodiment of the present invention. In one embodiment, the detection devices 104 of the neutron detection system 100 may be disposed within a volume of neutron moderating material 109 (e.g., continuous volume of moderating material or volume of moderating material formed with discrete moderating elements 106). In an additional embodiment, as shown in FIG. 1E, one or more of the neutron detection devices 104 may include two or more neutron detection elements 105 (e.g., independent neutron reactive elements) suitable for detecting impinging neutrons.

In another embodiment, the neutron detector 102 may include one or more neutron absorber elements 120 positioned between at least some of the detector devices 104 and moderator elements 106, as shown in FIG. 1C. For the purposes of the present disclosure, the absorber elements 120 may also be referred to as "backscatter stoppers" 120. In a further embodiment, each moderating element 106 is bounded by one of the absorber elements 120, whereby the absorber elements 120 are configured to confine scattered neutrons to the given moderator element in which the neutrons initially reach thermal energies. In one embodiment, the absorber elements 120 may consist of a volume of material disposed within a moderating neutron spectrometer volume in the proximity of one or more detecting devices 104 and are configured to capture backscattered neutrons (with the greatest probability at the energy where the cross section for capture by the absorber element is highest). Applicants note that by capturing backscattered neutrons the scattering dependent intensity along one or more coordinate directions becomes more pronounced due to less blurring, resulting in a more unique scattering intensity. The reduced smearing represents an improvement on classical moderating type neutron spectrometer systems in which scattering dependent intensity along one or more coordinate dimensions is significantly blurred (significant overlap in the response functions of the detection elements) which leads to reduced energy resolution or energy metric resolution.

In a further embodiment, the detector 102 of the detection system 100 may be surrounded by an electromagnetic lightproof shield 122. In another embodiment, a neutron and/or background radiation shield 126 may be disposed about the exterior portion of the detector 102. In an additional embodiment, a set of data acquisition (DAQ) and/or control circuitry elements 124 may be disposed in proximity to the one or more detection devices 104 and within the internal volume of the detector 102.

Applicants note that the spatial resolution of the locations of neutron interaction events (e.g., capture, induced-fission or scattering events) within the neutron detector 102 allows for the determination, by control system 108, of one or more energy or spatial characteristics of the neutrons 103 emanating from the neutron source 101. The one or more energy or spatial characteristics include, but are not limited to, energy, energy spectrum, dose, source type and/or the spatial point of emanation of the impinging neutrons (e.g., isotropic incident neutrons, anisotropically incident neutrons, or parallel incident neutrons).

Further, the present invention also provides for high intrinsic efficiency (i.e., intrinsic efficiency to $^{252}$Cf) detection of neutrons impinging on the neutron detection system 100 over the thermal to fast neutron energy range. Most neutron reactive materials, such as, but not limited to, boronated materials or lithiated materials, suitable for use in the neutron detecting system 100 of the present invention have a greater probability of capturing thermal neutrons than higher energy neutrons. One way to efficiently capture incident higher energy neutrons (e.g., fast neutrons) is to embed the given one or more detection devices 104 at a selected depth (or depths) within a neutron moderating material 109. As a result, neutron detection devices 104 disposed near the surface of the neutron detection system 100 are more sensitive to neutrons impinging on the surface of the detector 102 at thermal energies than neutron detection devices 102 disposed at larger depths, which are more sensitive to initially fast neutrons, which are thermalized by the intervening neutron moderating material 109 (e.g., high density polyethylene). By arranging the neutron detection devices 104 at progressively larger distances (e.g., linear spacing or non-linear spacing) from a surface of the moderating material 109 and creating multiple independent neutron detection elements 105 (although this is not a requirement of the present invention) in the various solid state neutron detection devices 102 it is possible to determine various energy or spatial characteristics of the impinging neutrons 103 (e.g., energy spectrum, dose, source type, direction of emanation of impinging neutrons and the like). Real-time determination of incident neutron energy and direction of emanation allows for the statistical inference of conditions related to the given neutron source 101. For example, by measuring the incident neutron energy spectrum and the directionality of incident neutrons it is possible to deduce the type of neutron source (e.g., cosmic-ray production of neutrons, weapons grade plutonium source, or plutonium-beryllium source for scientific research).

In one embodiment, the one or more detection devices 104 may include, but are not limited to, microstructured semiconductor neutron detectors (MSNDs). In one embodiment, the MSND-based semiconductor devices of the present invention may include devices consisting of a semiconductor substrate including microscopic cavities (e.g., holes) etched into the semiconductor surface, whereby the etched cavities are subsequently filled with a neutron reactive material, such as $^{10}B$ or $^{6}LiF$ submicron powders. It has been shown that these devices may be capable of thermal detection efficiencies exceeding 35%.

In a further embodiment, the MSND-based detection devices 104 of the system 100 may be formed by etching cavities into float-zone-refined (FZR) Si to produce a selected pattern (e.g., overall hexagonal or square pattern). The cavities may be etched so that they do not reach completely through the device. In this embodiment, holes or trenches of various shapes are etched into the semiconductor surface, wherein the trenches may extend across the semiconductor substrate and are etched almost through the substrate and are subsequently filled with neutron reactive material. Microstructured Neutron Detection devices are described in detail by McGregor et al. in U.S. Pat. No. 7,164,138, issued on Jan. 16, 2007, and U.S. Pat. No. 6,545,281, issued on Apr. 8, 2003, which are incorporated herein by reference in their entirety.

In another embodiment, the one or more detection devices 104 may include, but are not limited to, semiconductor devices coated in a neutron reactive material. For example, the one or more detection devices 104 may include, but is not limited to, a semiconductor device coated in $^{10}B$ or $^{6}LiF$.

In another embodiment, as shown in FIGS. 1C-1H, the individual neutron detection devices 104 that make up the plurality of the detection devices 104 may have a substantially planar shape. For example, one or more of the neutron detection devices 104 may include a detection device 104 having a geometrical shape with very high aspect ratio (i.e., very thin). For instance, the neutron detection devices 104 may include a flat circular shaped neutron detection device, such as the disc-shaped detector device 104 shown in FIG. 1H. Applicants note that a variety of geometrically shaped neutron detection devices 104 are suitable for use in the neutron detection system 100, including, but not limited to, rectangles, squares, circles, ellipses, triangles, or hexagons. Applicants note that any geometrical shape may be implemented provided it yields a translatable pattern that can be tracked along one or more coordinate axes. It is further contemplated that, while planar-shaped detection devices 104 may serve as the most easily fabricated devices, devices may also be fabricated individually and embedded at the locations necessary to obtain a coordinate dependence of the neutron capture, induced-fission or scattering intensity. It should be recognized by those skilled in the art that the use of planar detection devices 104 is not a limitation and that the implemented neutron detection devices 104 may have a substantially non-planar character (e.g., devices having low aspect ratio) as long as they represent a volume along a determined coordinate axis. For instance, one or more of the neutron detection devices 104 may have a ribbon shape, or packing of cubes.

In a further embodiment, the plurality of neutron detection devices 104 may be disposed within a neutron moderator material 109 such that one or more of the neutron detection devices 104 are aligned in a substantially parallel manner. For example, as shown in FIGS. 1C-1D, nine individual neutron detection devices 104 are aligned such that the surfaces of the individual devices are substantially parallel with respect to one another. For example, a first detection device, a second detection device, and up to and including an Nth detection device may be aligned such that the surfaces of the individual devices 104 are substantially parallel with respect to one another.

Figure 1F:
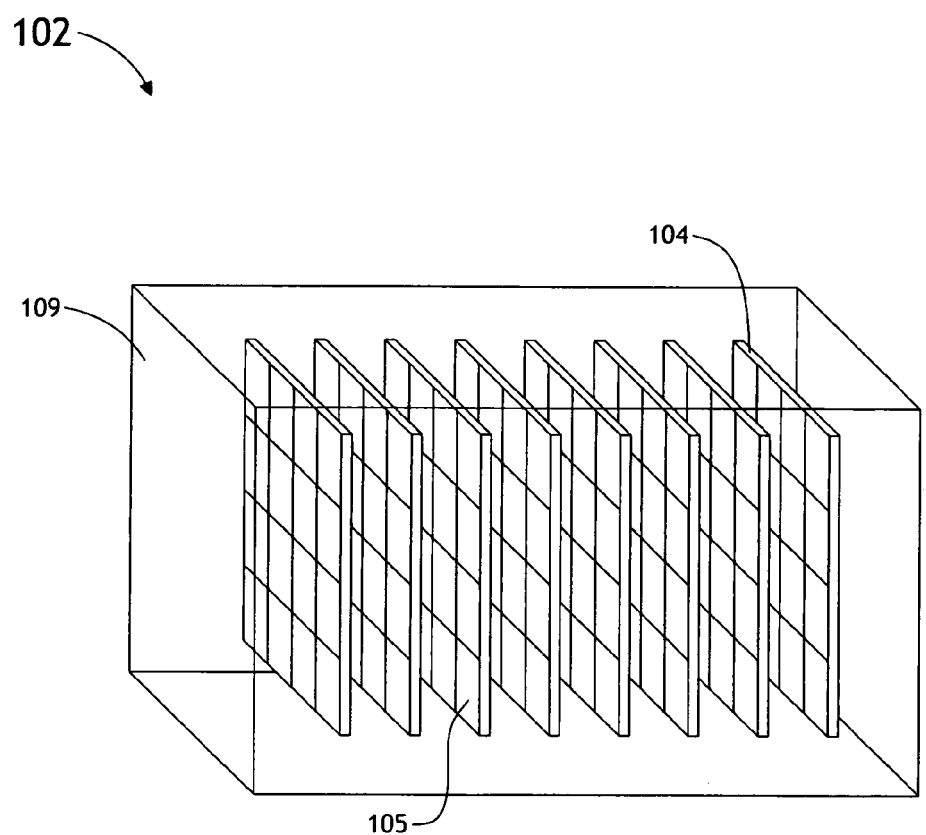

In another embodiment, the plurality of neutron detection devices 104 of the neutron detection system 100 may include a 'stack' of a selected number of individual detection devices 104. For example, a stack of a selected number of substantially planar and parallel aligned neutron detecting devices 104 may be disposed within a volume of a chosen neutron moderating material 104. For instance, as shown in FIGS. 1E and 1F, a stack of eight substantially planar and parallel aligned neutron detection devices 104 are embedded within a volume of a selected moderating material 109. In another instance, as shown in FIGS. 1C-1D, a stack of nine substantially planar and parallel aligned neutron detection devices 104 are disposed within a moderating material by arranging each of the internal devices between two moderator slabs 106 (e.g., cylinders). It should be recognized by those skilled in the art that the use of eight or nine devices is not a limitation and that the neutron detection system 100 may employ any number of detection devices 104, based on the specific demands on the detection system 100. It is noted herein that increasing the number of detection device layers in the neutron detection system 100 may improve both neutron capture efficiency and neutron spectral and directional measurement accuracy up to the limit at which the moderator in between planar devices compromises the scattering-energy (i.e., moderation) relationship.

In one embodiment, the moderating volume 109 may substantially encapsulate the detection devices 104, as shown in FIG. 1E. In another embodiment, the moderating volume 109 may include a set of discrete moderating elements 106, such as, but not limited to, a set of cylinders or blocks of moderating material positioned between adjacent detection devices, as shown in FIG. 1C-1D. In a further embodiment, in a cylindrical shaped detector 102 as shown in FIGS. 1C-1D, a series of cylinder shaped moderating elements 106 may be positioned between adjacent detector devices 104. Suitable neutron moderating materials include materials with a high content of low atomic weight atoms having a relatively large cross section for neutron scattering but a relatively low neutron capture cross sections, such as hydrogen, boron-11, beryllium, carbon and nitrogen. For example, suitable moderator materials include, but are not limited to, elemental, compounded, or mixture form of water (e.g., light or heavy), organic compounds, such as carbon-based polymers (e.g., plastics, polyethylene, high density polyethylene, and the like), granular inorganic materials, and graphite. For instance, each of the moderator elements 106 of the detector 102 may be formed from high density polyethylene (HDPE). It should be recognized that the use of a HDPE as a neutron moderator is not a limitation and that the neutron detection devices 104 may be embedded or surrounded by other suitable neutron moderating materials. It will be recognized by those skilled in the art that the choice of neutron moderator material will depend on the exact purposes of the given neutron detection system 100 and different moderators may be more or less suitable in different contexts (e.g., size limitations, portability requirements, energy sensitivity requirements, or directional sensitivity requirements). The use of HDPE and other moderator materials for moderating neutrons in a neutron detection setting is described in U.S. Pat. No. 7,514,694 filed on Jun. 19, 2007 which is incorporated herein by reference.

In another embodiment, materials suitable for the neutron absorber elements 120 may include, but are not limited to, elemental, compounded, or mixture form of cadmium, gadolinium, boron, lithium, indium, iron, lead, and mercury. Applicants note that the absorber element 120 may be configured to reduce the likelihood that a backscattered and thermalized neutron is not detected short of where it should have been detected would the neutron have only lost energy (elastically scattered) through forward scattering alone. In this sense, neutron capture materials with large cross sections in epi-thermal and higher energy regions (e.g., Br) may also be useful in improving the "uniqueness" of the neutron intensity along one or more coordinate directions (much like a filter effect).

In one embodiment, as shown in FIGS. 1C-1D, the neutron detector 102 of the detection system 100 may include a snout assembly 113 configured to ensure the neutrons detected within the internal volume of the detector are epithermal or faster neutrons.

In one embodiment, the snout assembly 113 includes a first thermal neutron detection device 104 (in this case the leftmost detection device 104), a backscatter blocker/absorber 107 and a void region 111. The first neutron detection device 104 may consist of any neutron detection device described in the present disclosure. In one embodiment, the first neutron detection device 104 may include a high efficiency semiconductor detection device. The first detection device 104 is fastened to the front of the detector 102, so as to be the initial detector that neutrons potentially interact with. In a further embodiment, directly behind the neutron detection device 104 is a neutron absorbing sheet 107 (e.g., Cd sheet) configured to prevent backscattered thermal neutrons from entering the front neutron detection device 104 from behind (i.e., from the right side in FIG. 1C-1D). Since the device incorporates numerous cylinders (e.g., high-density polyethylene (HDPE) cylinders) as moderators, it becomes important for analysis purposes that the neutrons that interact in the front thermal neutron detection device are from thermal neutrons initially entering the detector 102. The blocking/absorbing disk 107 behind the front detection device 104 also ensures that no thermal neutrons reach the spectral detection devices 104 from outside and that all thermal neutrons detected in the main body of the detector 102 are a result of incident epithermal and fast neutrons that have been thermalized in the moderator elements 106 of the detector 102.

In a further embodiment, behind the front end detection device 102 and absorbing disk 107 is a void region 111 configured to reduce the number of captured gamma rays produced in the moderator (e.g., Cd) disk from entering the spectrometer 102 body by reducing the solid angle to the second detection device 104 (located behind the first moderator disk 106). Following the void region 111 is a series of high-efficiency neutron detection devices 104, absorber shields 120, and moderator elements 106, as described throughout the present disclosure. The HDPE moderators reduce the energy of the neutrons, thereby increasing the probability they will be absorbed within an adjacent semiconductor detection device 104. Fast neutrons can penetrate much deeper than epithermal neutrons, hence the detector interaction distribution yields the probable neutron energy distribution from the source 101. To prevent migration of thermalized neutrons from backscattering into frontward detection devices, absorber shields (e.g., Cd shields) are placed behind every semiconductor neutron detection device. In the case of Cadmium-based absorber shields, such a precaution helps ensure that sub-cadmium neutrons interact only in the detection device 104 adjacent to the moderator cylinder in which the neutron is moderated below the Cd cutoff energy. Although FIGS. 1C-1D show only six detector/absorber/moderator stacks, the actual design may incorporate up to 20 or more such stacks. As such, the fine distribution of detection devices 104 dispersed within the detector allows for discernment of the incident neutron energy spectrum. Further, the design allows for discernment of epithermal neutrons.

The canister inside which the detectors are stacked is designed with the following design criteria. First, signals from the semiconductor neutron detectors must be extracted from the unit efficiently. Second, after neutrons have scattered out of the column of moderators, retry into the column of thermalized neutrons must be effectively eliminated. Third, thermalized neutrons must not be allowed to enter the main body of the device from the sides, only neutrons incident from the front can enter the moderator-detector stack.

In another embodiment, a canister lining configured to align the moderators 106 in a row is fabricated from a lightweight electromagnetic interference shielding metal (e.g., aluminum) in order to shield the neutron detection devices from interference. In another embodiment, on the inside of the lining is a sleeve of Cd, which eliminates backscattered sub-cadmium neutrons from reentering the HDPE column after scattering out. Surrounding the Al tube containing the detector-moderator stack is a cylindrical annular sleeve of borated HDPE to prevent neutrons incident on the side of the device from reaching the detector-moderator stack. The back of the device may have a similar external neutron shield.

In another embodiment, the neutron detection devices 104 of the plurality of neutron detection devices 104 may be positioned along a common orientation axis. For example, as illustrated in FIG. 1C-1F, the neutron detection devices 104 may be spaced linearly along an axial direction. For instance, the neutron detection devices 104 within a stack of neutron detection devices may be periodically spaced along a common axis at selected interval (e.g., 0.25 to 2 cm interval). It should be recognized by those skilled in the art that the specific linear spacing interval of neutron detection devices 104 is not a limitation and that various spacing intervals may be used in the neutron detection system 100, with the specific spacing chosen according to specific efficiency, accuracy, and sensitivity requirements of the given system. By way of another example, the neutron detection devices 104 of the detector 102 may be spaced nonlinearly along a common axis. For instance, the neutron detection devices 104 within a stack of neutron detection devices 104 may be spaced along a common axis at intervals of 0.5, 1.0, 1.5, 2.0, 3.0, 5.0, 7.5, 10, 15, and 20 cm, as measured from a surface of the detector 102. It should be recognized by those skilled in the art that the specific nonlinear spacing intervals of neutron detection devices 104 is not a limitation and that various spacing intervals may be used in the neutron detection system 100, with the specific spacing chosen according to specific efficiency, accuracy, and sensitivity requirements of the given system for a known incident neutron energy (i.e., neutron moderation is not perfectly linear between depth and energy).

Applicants have found that for a cylindrical-shape detector 102 including 30 detection devices 104 spaced apart by 1 cm, with each having a 6.35 cm radius and a moderator thickness of 0.5 cm a total device efficiency of 30% is achievable.

In one embodiment, the volume of neutron moderation material may be defined by a three dimensional shape. For example, the volume of moderating material surrounding the plurality of neutron detection devices 104 may include, but is not limited to, a cylinder, a sphere, a cone, an ellipsoid, a cuboid or a hexagonoid. For instance, the plurality of neutron detection devices 104 may be embedded in a cylindrical shaped volume of neutron moderating material. In another instance, the plurality of neutron detection devices 104 may be embedded in a spherically shaped volume of neutron moderating material. It will be recognized by those skilled in the art that the symmetry of the volume of moderation material is such that it allows for a systematic energy-moderation relationship to be determined.

Figure 1G:
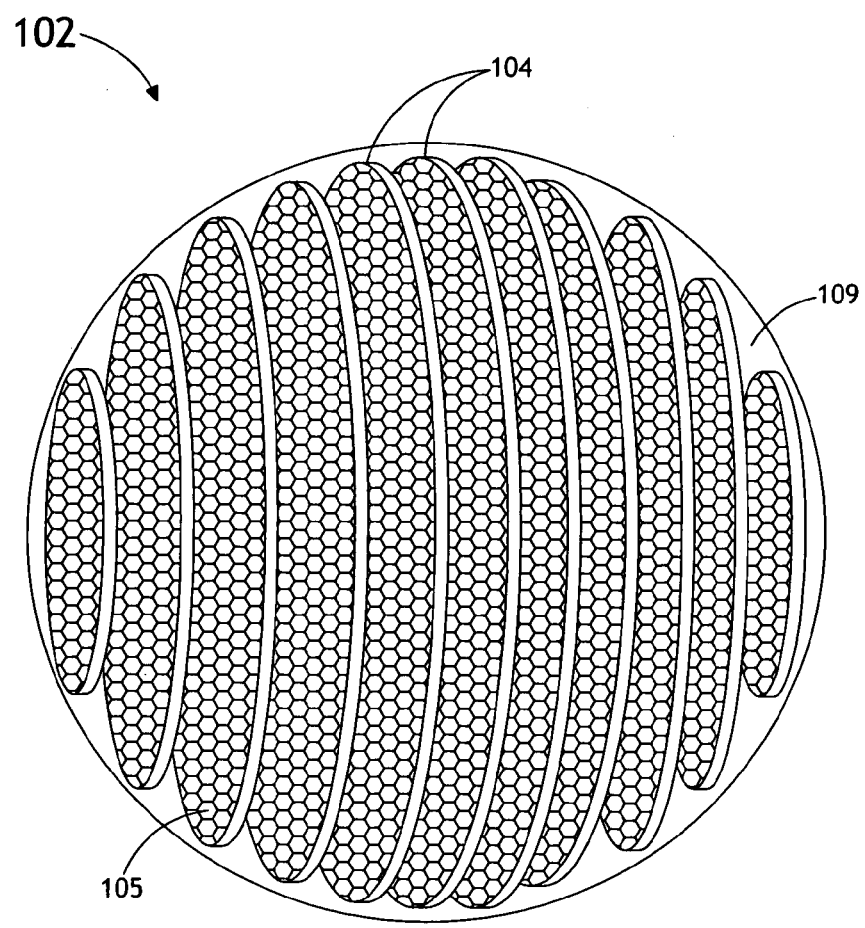

In a further embodiment, the volume of moderating material 109 may be dimensioned so as to substantially conform to the outer edges of the one or more neutron detection devices 104 of the neutron detection system 100. For example, as shown in FIG. 1G, the surface of a spherically shaped volume of neutron moderating material may conform to the surface of the detection volume, which may, but is not required to, serve as a defining boundary to the one or more neutron detection devices.

Figure 2A:
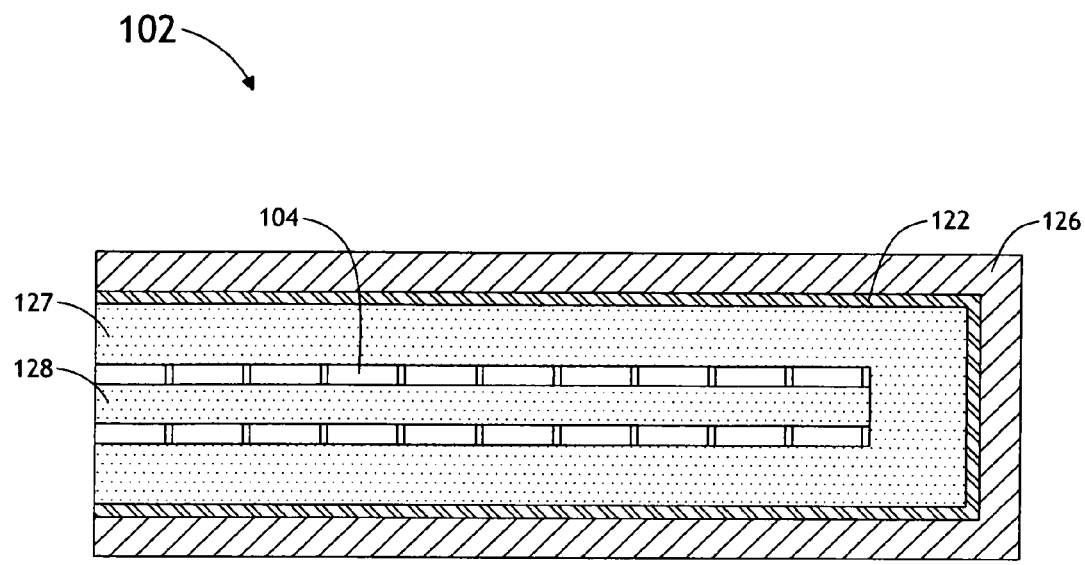
Figure 2B:
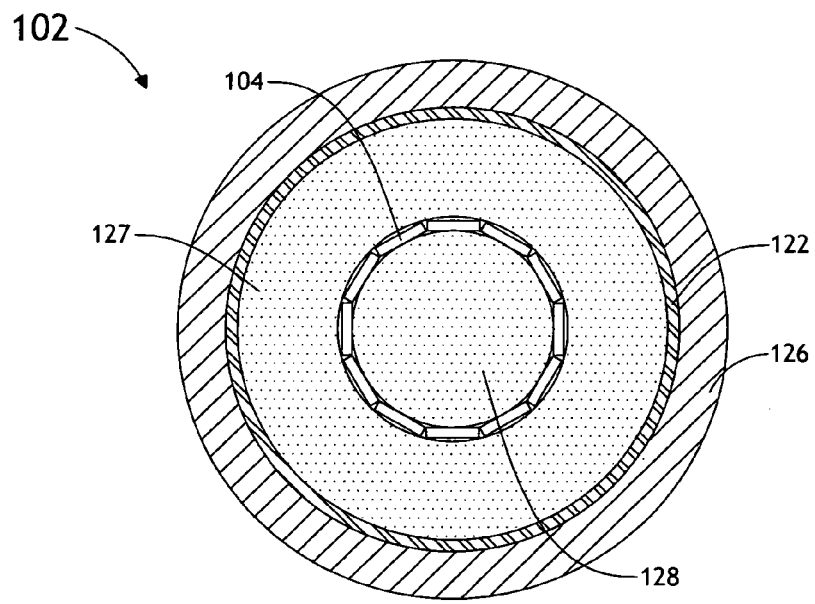

FIGS. 2A-2B illustrate schematic views of a detector 102 of the detection system, in accordance with one embodiment of the present invention. In this embodiment, the detector 102 is designed with the detection devices 104 arranged axially around a central moderator 128. In another embodiment, an outer moderator 127 surrounds the compact detection devices 104 and core moderator 128. In a further embodiment, an electromagnetic lightproof shield 122 may surround the detection volume of the detector 102. In a further embodiment, a neutron and background radiation shield 126 may surround the entire structure. The compact neutron detection devices 104 may include coated semiconductor neutron detection devices or MSNDs. The moderators 127, 128 may include, but are not limited to, elemental, compounded or mixtures of plastic, polyethylene, high density polyethylene, carbon, graphite or water. It is further noted that the detector embodiment of FIGS. 2A-2B may be formed in any geometrical shape described in the present disclosure, including, but not limited to, a cylinder, parallelepiped or conical frustum.

Figure 3A:
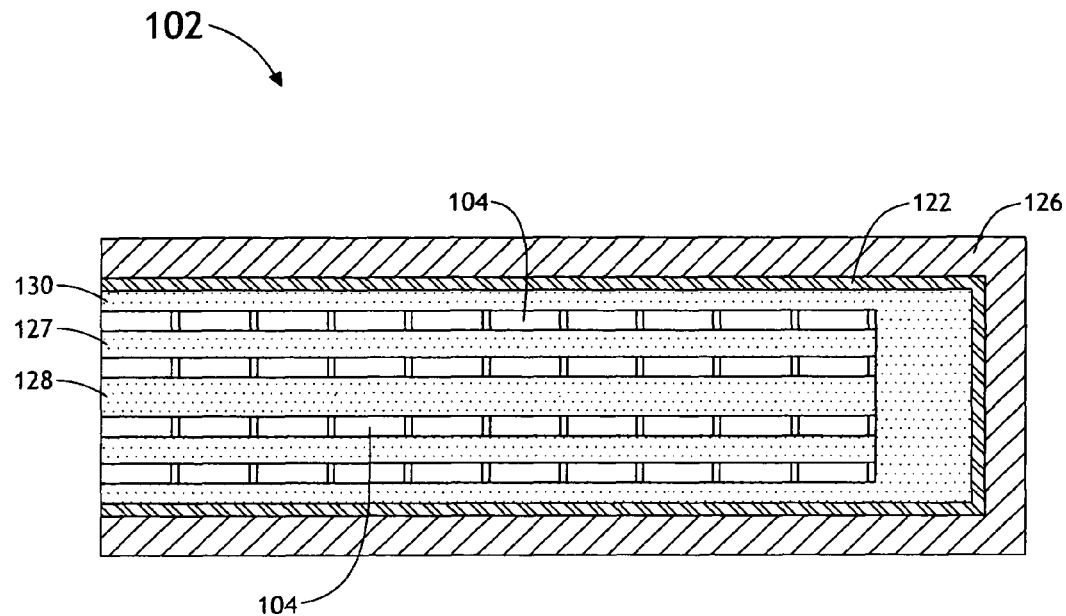
Figure 3B:
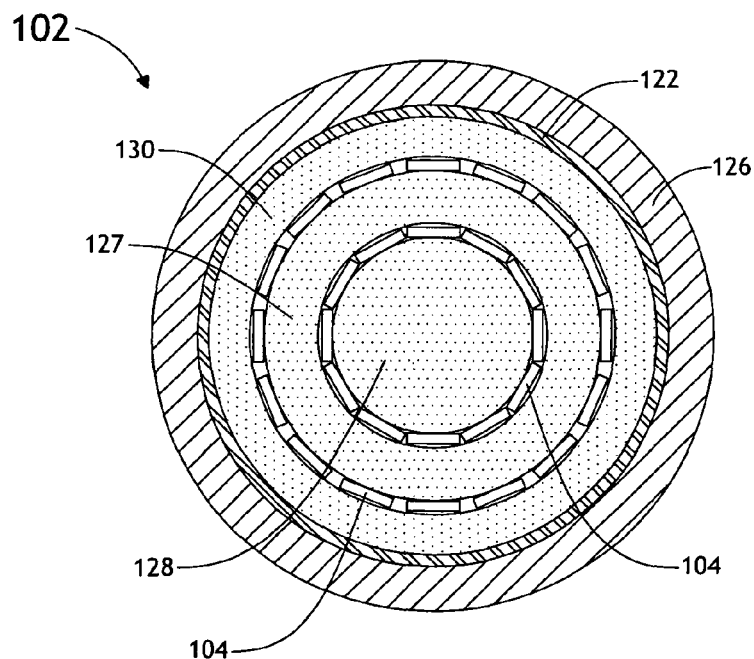

FIGS. 3A-3B illustrate schematic views of a detector 102 of the detection system, in accordance with one embodiment of the present invention. In this embodiment, the detector 102 is designed with one set of detection devices 104 arranged axially around a central moderator 128. In another embodiment, a middle moderator 127 surrounds the compact detection devices 104 and core moderator 128. In a further embodiment, the compact neutron detection devices 104 are arranged around the middle moderator 127, whereby an outer moderator 130 surrounds the compact detectors 104, middle moderator 127 and core moderator 128. In a further embodiment, an electromagnetic lightproof shield 122 may surround the detection volume of the detector 102. In a further embodiment, a neutron and background radiation shield 126 may surround the entire structure. The compact neutron detection devices 104 may include coated semiconductor neutron detection devices or MSNDs. The moderators 127, 128, 130 may include, but are not limited to, elemental, compounded or mixtures of plastic, polyethylene, high density polyethylene, carbon, graphite or water. It is further noted that the detector embodiment of FIGS. 3A-3B may be formed in any geometrical shape described in the present disclosure, including, but not limited to, a cylinder, parallelepiped or conical frustum.

Figure 4A:
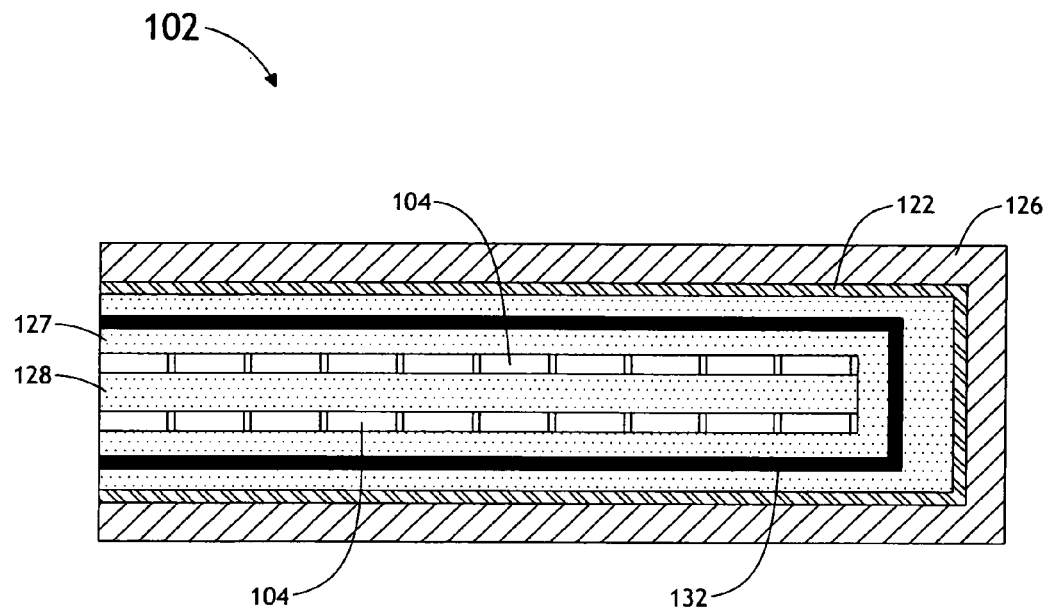
Figure 4B:
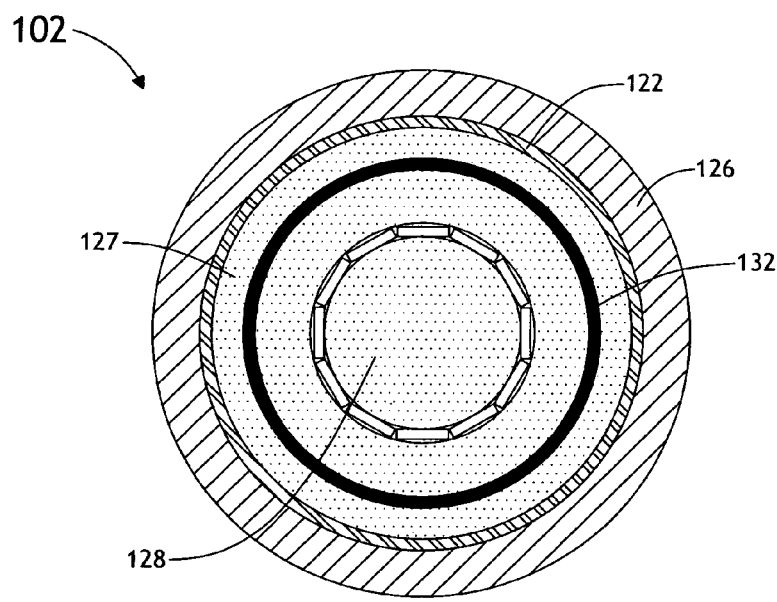

FIGS. 4A-4B illustrate schematic views of a detector 102 of the detection system, in accordance with one embodiment of the present invention. In this embodiment, the detector 102 is designed with one set of detection devices 104 arranged axially around a core moderator 128. In another embodiment, an outer moderator 127 surrounds the compact detection devices 104 and core moderator 128. In another embodiment, neutron absorbing shield 132 (e.g., Cadmium shield) is arranged in the outer moderator 127 and around the core moderator 128 and compact neutron detection devices 104. The neutron absorbing shield 132 may include, but is not limited to, elemental, compounded or mixtures of cadmium, gadolinium, boron, lithium, indium, iron, lead, and mercury. In a further embodiment, an electromagnetic lightproof shield 122 may surround the detection volume of the detector 102. In a further embodiment, a neutron and background radiation shield 126 may surround the entire structure. The compact neutron detection devices 104 may include coated semiconductor neutron detection devices or MSNDs. The moderators 127, 128 may include, but are not limited to, elemental, compounded or mixtures of plastic, polyethylene, high density polyethylene, carbon, graphite or water. It is further noted that the detector embodiment of FIGS. 4A-4B may be formed in any geometrical shape described in the present disclosure, including, but not limited to, a cylinder, parallelepiped or conical frustum.

Figure 5A:
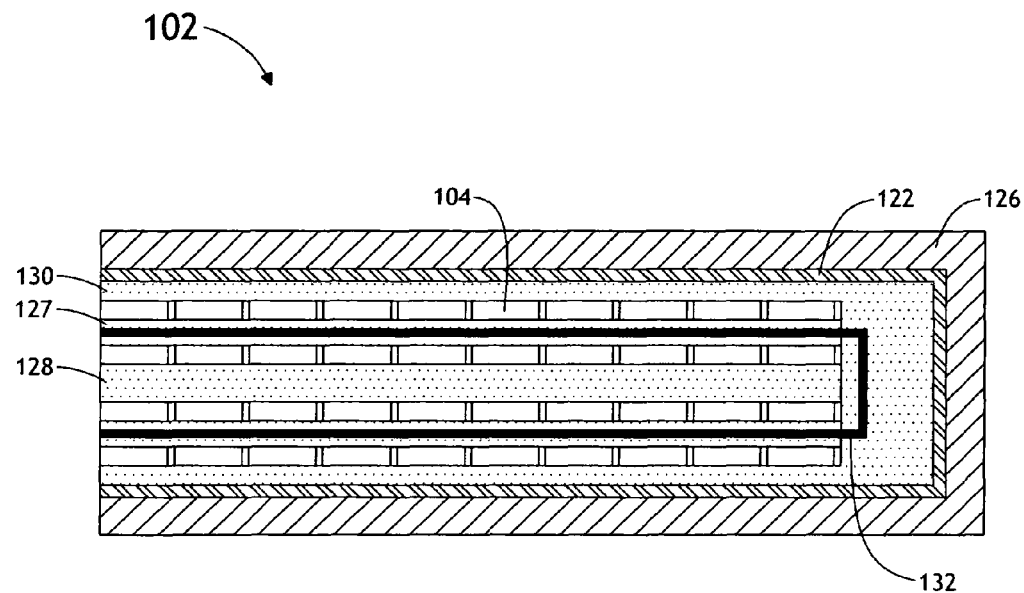
Figure 5B:
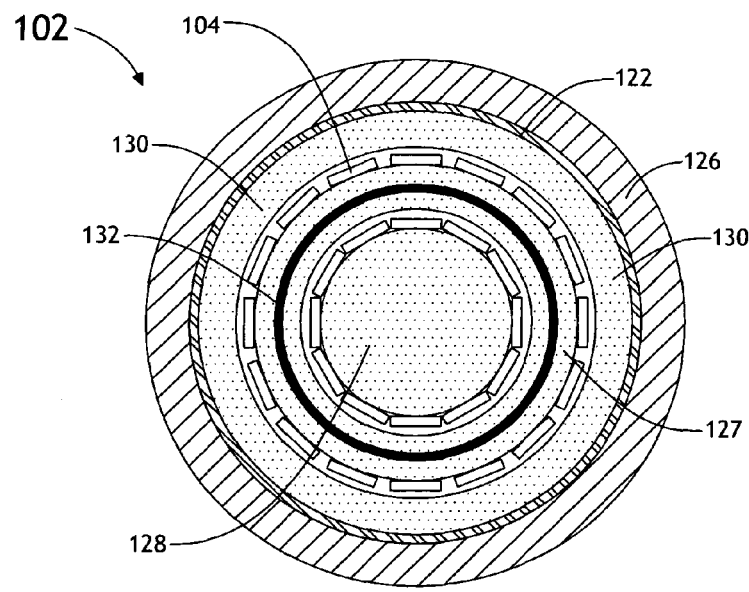

FIGS. 5A-5B illustrate schematic views of a detector 102 of the detection system, in accordance with one embodiment of the present invention. In this embodiment, the detector 102 is designed with one set of detection devices 104 arranged axially around a core moderator 128. In another embodiment, a middle moderator 127 surrounds the compact detection devices 104 and core moderator 128. In another embodiment, the compact neutron detection devices 104 are arranged around the middle moderator 127. In another embodiment, an outer moderator 130 surrounds the compact detection devices 104, the middle moderator 127 and the core moderator 128. In another embodiment, a neutron absorbing shield 132 is arranged in the middle moderator 127 and around the core moderator 128, placed between the compact neutron detectors 104 on the core moderator 128 and compact neutron detectors 104 on the middle moderator 127.

Figure 6A:
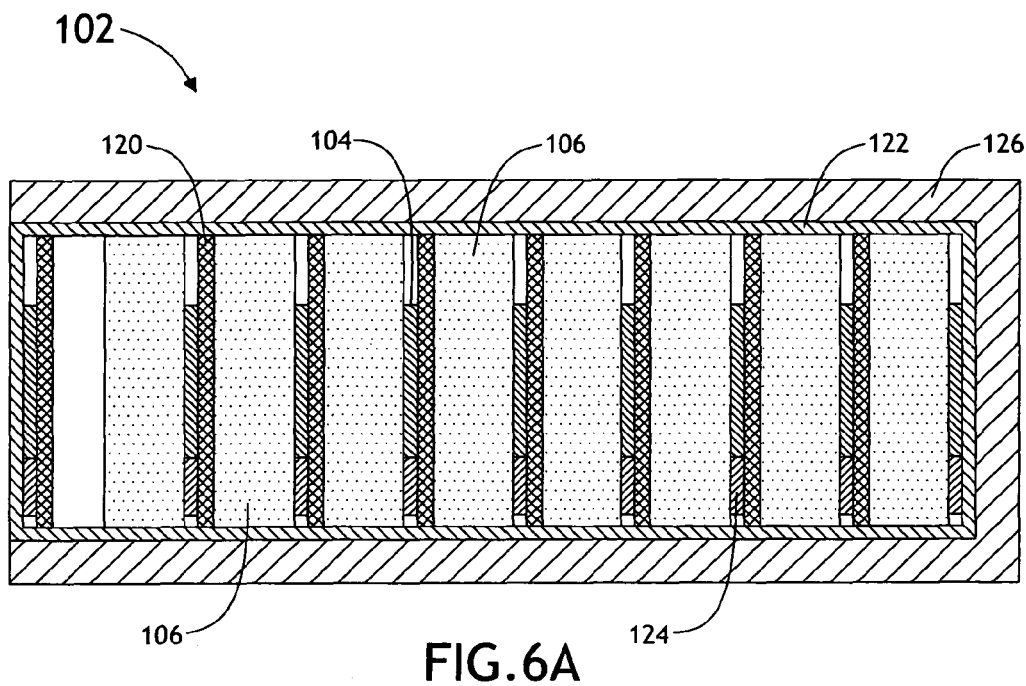
Figure 6B:
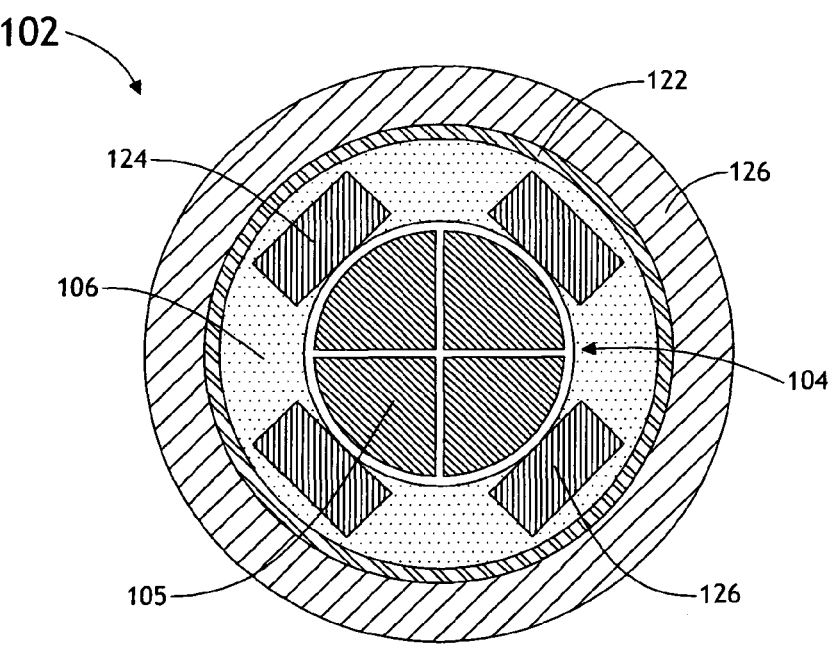

FIGS. 6A-6B illustrate schematic views of a detector 102 of the detection system, in accordance with one embodiment of the present invention. In this embodiment, the detector 102 includes a series of low-power high-efficiency semiconductor thermal-neutron detection devices 104 with cylinders of plastic neutron moderator 106 placed between each pair of detection devices 104. In a further embodiment, each moderating region is bounded by a neutron absorber 120 so as to confine neutrons to the moderator region in which the given neutrons first reach thermal energies. In a further embodiment, the detection devices 104 are segmented compact detection devices 104 including multiple detection elements 105. In an additional embodiment, the data acquisition electronics 124 of the detector may be distributed such that each segmented element 105 has a corresponding set of DAQ circuitry elements 124.

Figure 7:
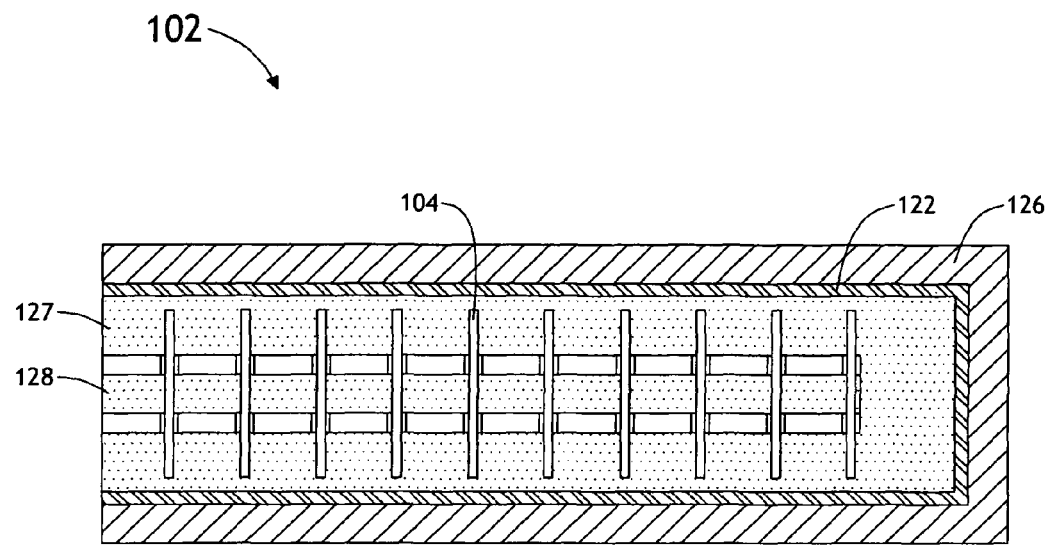

FIG. 7 illustrate a schematic view of a detector 102 of the detection system, in accordance with one embodiment of the present invention. In this embodiment, the detector 102 is designed with the detection devices 104 arranged axially around a central moderator 128. In another embodiment, an outer moderator 127 surrounds the compact detection devices 104 and core moderator 128. In a further embodiment, an additional set of detection devices 104 are arranged vertically along the axial direction. In a further embodiment, an electromagnetic lightproof shield 122 may surround the detection volume of the detector 102. In a further embodiment, a neutron and background radiation shield 126 may surround the entire structure. The compact neutron detection devices 104 may include coated semiconductor neutron detection devices or MSNDs. The moderators 127, 128 may include, but are not limited to, elemental, compounded or mixtures of plastic, polyethylene, high density polyethylene, carbon, graphite or water. It is further noted that the detector embodiment of FIG. 7 may be formed in any geometrical shape described in the present disclosure, including, but not limited to, a cylinder, parallelepiped or conical frustum.

Figure 8:
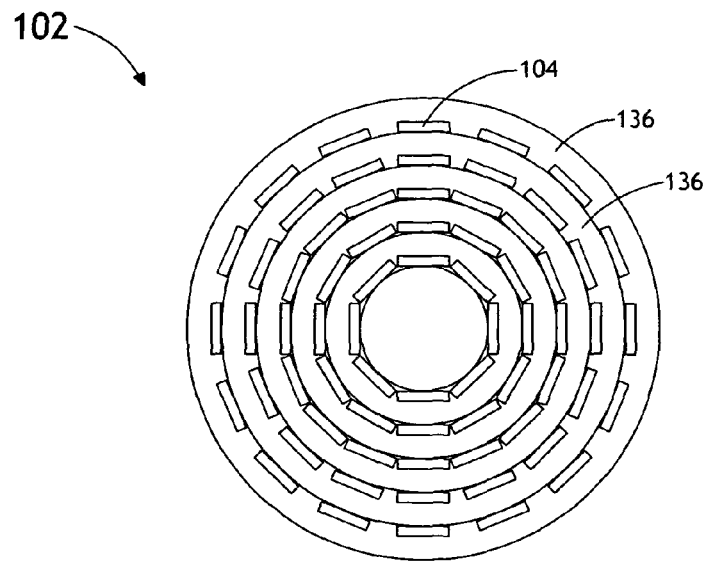

FIG. 8 illustrate a schematic view of a detector 102 of the detection system, in accordance with one embodiment of the present invention. In this embodiment, the detector 102 is a substantially spherical neutron detector 102 with compact detection elements 104 arranged radially in a moderator 106. In one embodiment, the compact neutron detectors 104 are arranged upon removable shells 136 of moderator 106. The moderator shells 106 may be composed of, but are not limited to, elemental, compounded or mixtures of plastic, polyethylene, high density polyethylene, carbon, graphite or water.

Figure 8A:
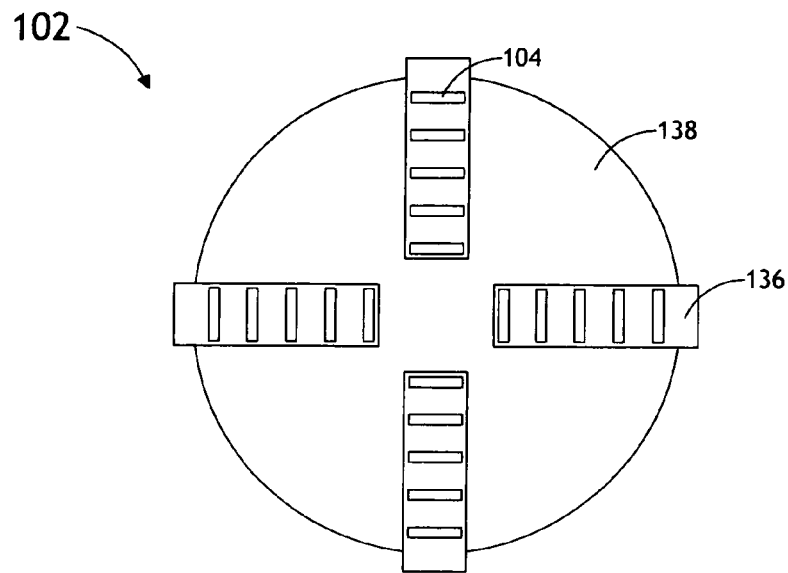
Figure 8B:
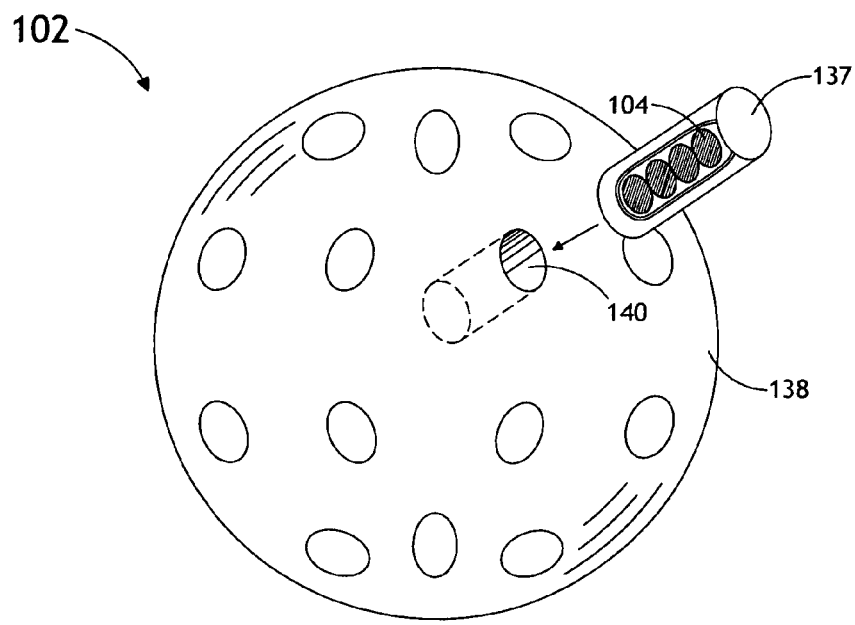

FIGS. 8A-8B illustrate a schematic view of a detector 102 of the detection system, in accordance with one embodiment of the present invention. In this embodiment, the detector 102 is a substantially spherical neutron detector 102 with compact detection device 104 arranged radially in a moderator where the compact neutron detection devices and arranged in removable moderator plugs 137. In this regard, the moderator plugs 137 may be selectably inserted radially into a large moderator mass 138 via the moderator plug receptacle 140. The moderator plugs 137 and large moderator mass 138 may be composed of, but are not limited to, elemental, compounded or mixtures of plastic, polyethylene, high density polyethylene, carbon, graphite or water.

In another embodiment, the detection system 100 may include two or more detectors 102 arranged substantially orthogonally to one another. For example, the detection system 100 may include a first cylindrical detector 102 and a second cylindrical detector, which are arranged such that their axial dimensions are perpendicular to one another. By way of another example, the detection system 100 may include a first cylindrical detector 102, a second cylindrical detector 102, and a third cylindrical detector 102, which are arranged such that their axial dimensions are mutually orthogonal to one another.

Figure 1H:
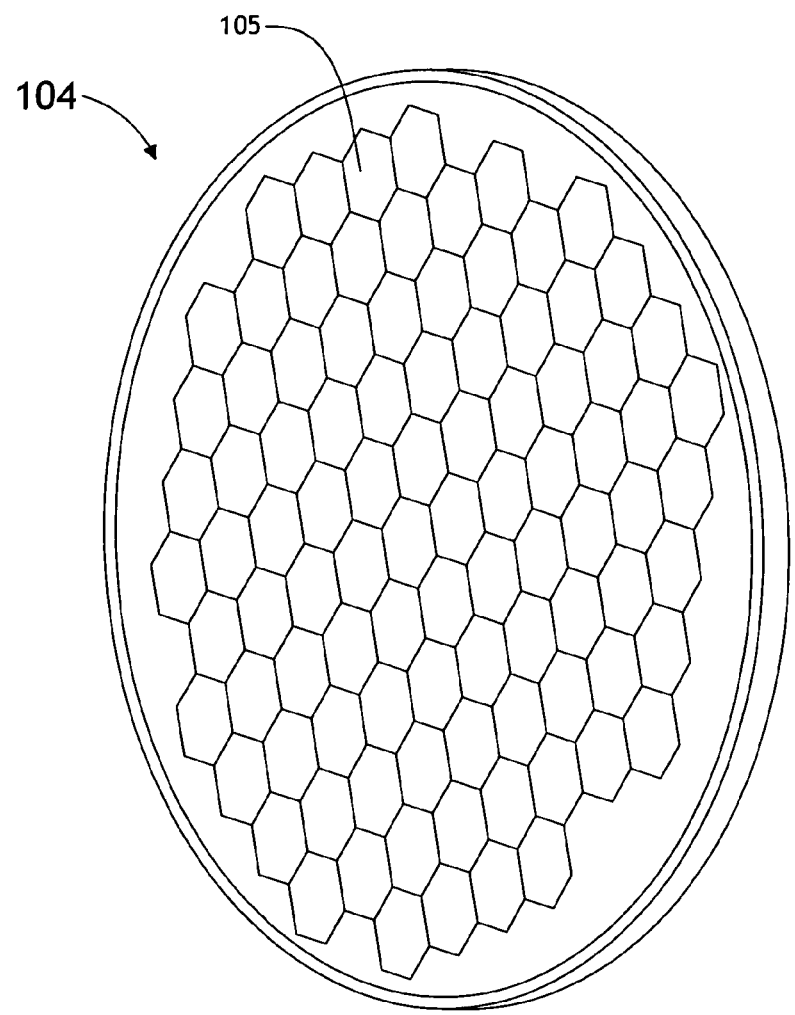
Figure 1I:
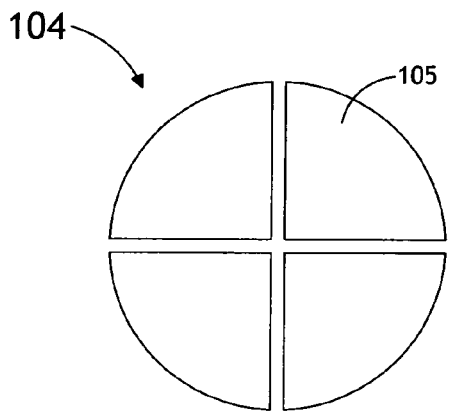
Figure 1J:
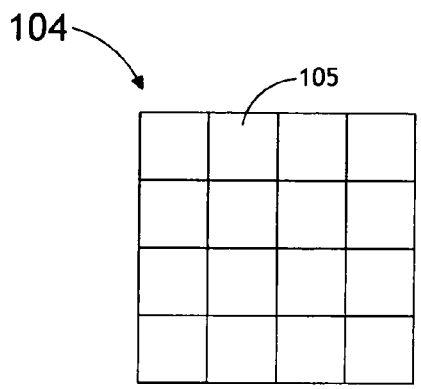
Figure 1K:
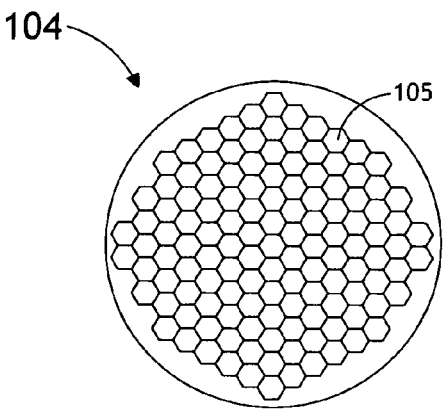
Figure 1L:
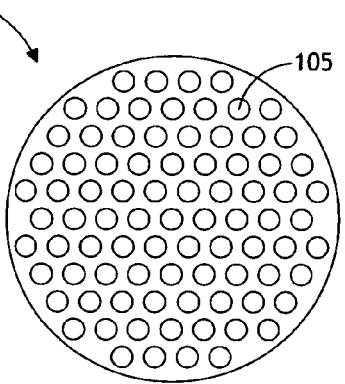
Figure 1M:
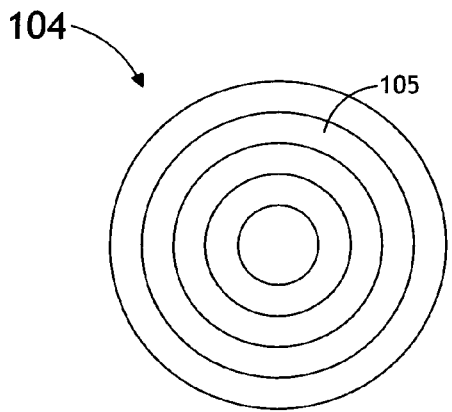
Figure 1N:
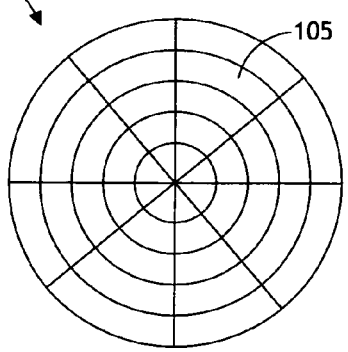

Referring now to FIGS. 1I through 1N, one or more of the neutron detection elements 105 of one or more of the neutron detection devices 104 may include detection elements 105 having a geometrical shape. For example, a neutron detection element 105 may include, but is not limited to, a solid state neutron detection element 105 having, from a top view, the shape of a circle, a portion of a circle, a hexagon, a rectangle (e.g., a square), a ring, an ellipse, or a triangle. For instance, as shown in FIG. 1I, the neutron detection devices 104 may contain a number of quarter-circle shaped neutron detection elements 105. In another instance, as shown in FIG. 1J, the neutron detection devices 104 may contain a number of square shaped neutron detection elements 105. In another instance, as shown in FIG. 1K, the neutron detection devices 104 may contain a number of hexagonal shaped neutron detection elements 105. In another instance, as shown in FIG. 1L, the neutron detection devices 104 may contain a number of circular shaped neutron detection elements 105. In an additional instance, as shown in FIG. 1M, the neutron detection devices 104 may contain a number of concentric ring shaped neutron detection elements 105. Further, as shown in FIG. 1N, the neutron detection devices 104 may contain a number of neutron detection elements 105 having a sectioned concentric ring shape. It should be recognized by those skilled in the art that the use of the described shapes for the neutron detection elements 105 is not a limitation and that the implemented neutron detection elements 105 of the neutron devices 104 may have a variety of geometrical shapes.

Moreover, it should be noted that the individual neutron detection elements 105 may have a substantially three dimensional character. For example, as shown in FIG. 1H, the volume of a detection element 105 (e.g., hexagonal shaped element 105) may extend along the axial direction of the detection device 104 below the planar surface of the detection device 104. It is this entire elemental volume (i.e., a voxel) that serves as the neutron detection (e.g. via neutron capture, neutron-induced fission, or scatter) element 105. The volumetric extent of a given three dimensional element 105 is fixed by: 1) the areal contact size used and 2) the device thickness, as illustrated in FIG. 1H respectively.

Referring again to FIGS. 1A through 1G, the plurality of the neutron detection devices 104 and the surrounding neutron moderating material 109 may be engineered such that the overall neutron detector 102 is substantially defined by a three dimensional shape. For example, the shape of the neutron detector 102 may include, but is not limited to, a cylinder, sphere, an ellipsoid, a cone, a cuboid, or a hexagonoid. It will be recognized by those skilled in the art that the choice of shape of the neutron detector 102 may depend on the specific purposes of the neutron detection system 100. The applicants have found that a cylindrically shaped detection volume is preferred in analyzing incident neutron characteristics when the incident neutrons have a preferential direction or of parallel incidence. It has been further found by the applicants that a spherically shaped detection volume 110 may be preferred in analyzing impinging neutron properties of isotropic neutrons.

Figure 9A:
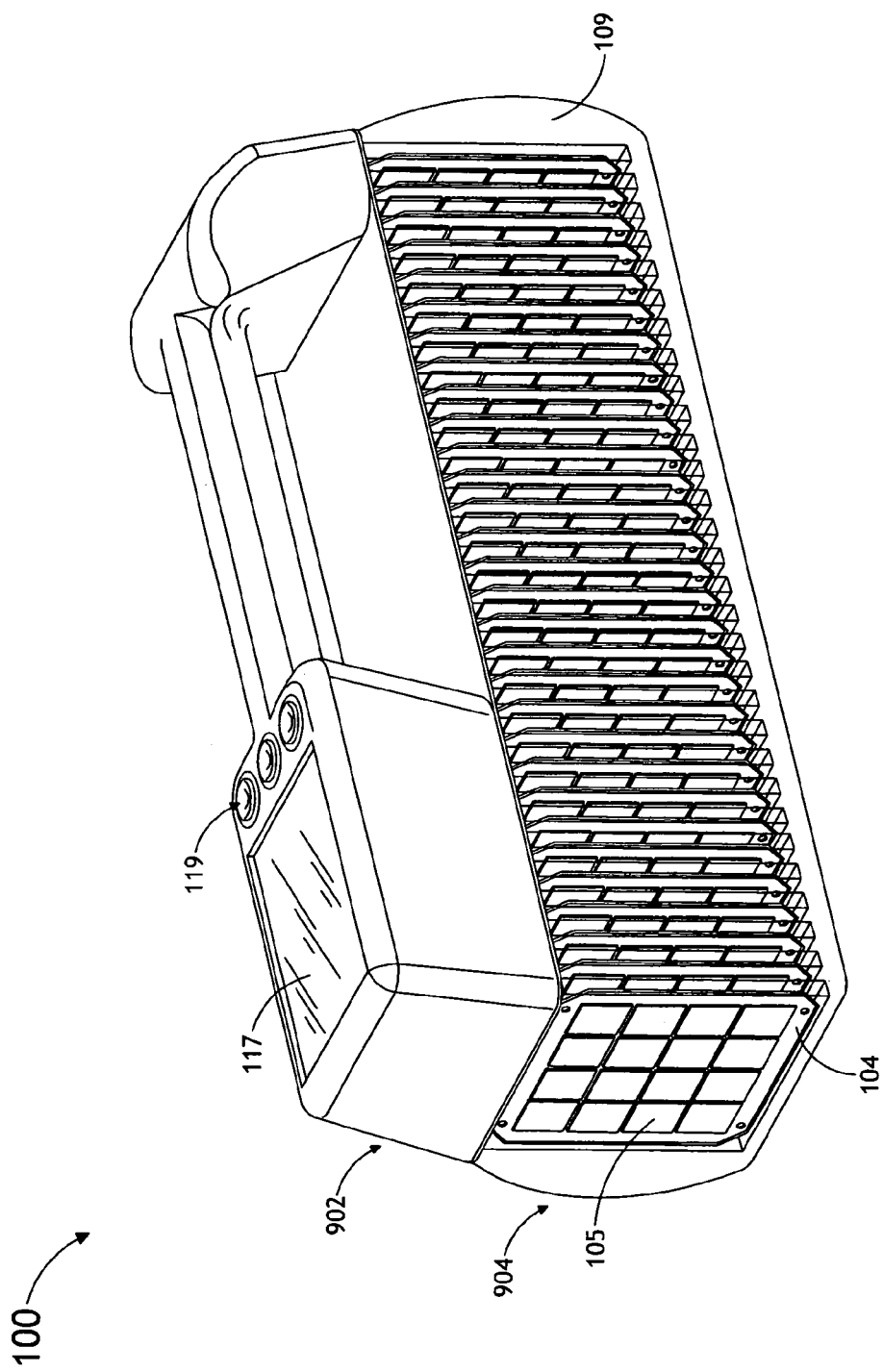
Figure 9B:
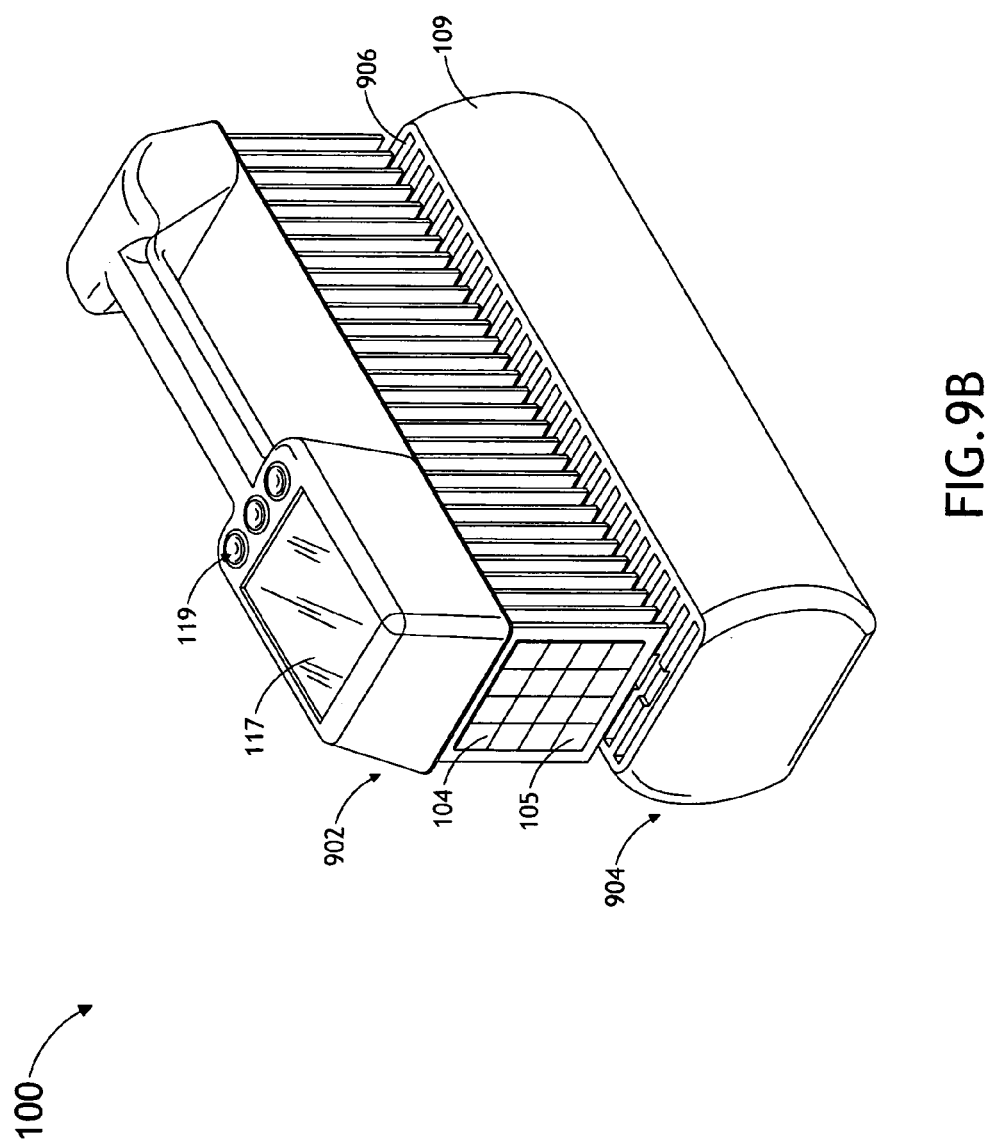
Figure 9C:
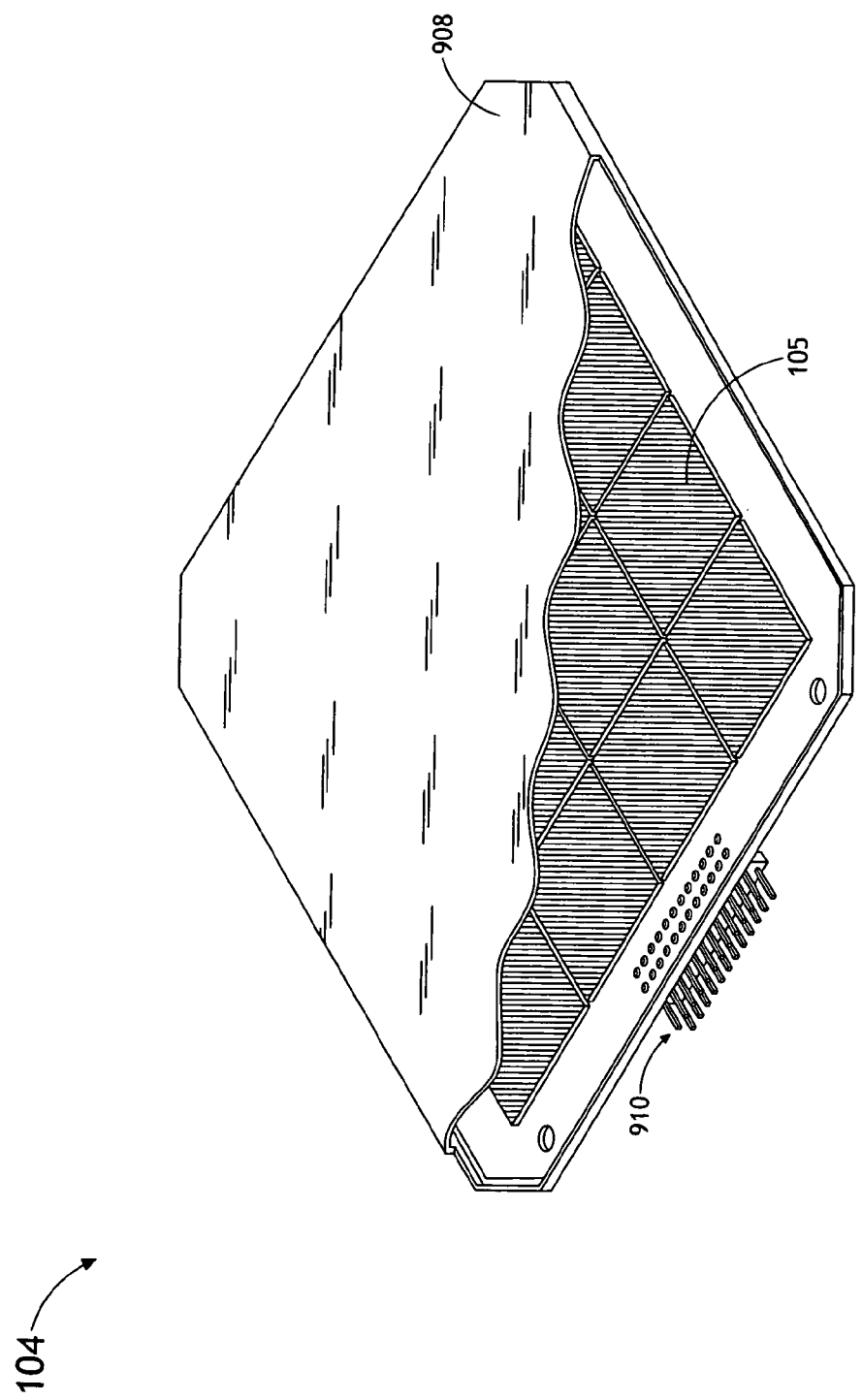

As illustrated in FIGS. 9A through 9C the system 100 may include control assembly 902 and a moderator assembly 904 configured for containing at least a portion of the system 100. In an embodiment, the control assembly 902 may include the display 117 and at least one user input device 119. The control assembly 902 may be configured for holding one or more detection device 104, each including at least one detection element 105. In further embodiment, the control assembly 902 may be configured to hold a plurality of detection devices 104, each including a plurality of detection elements 105. The detection devices 104 may further include a coating material 908 such as, but not limited to, radiation shielding material, absorbing material, electromagnetic light shielding material, and the like.

Each detection device 104 may be configured for removably coupling to the control assembly 902 via at least one connector 910. In one embodiment, the connector 910 may include one or more conductive pins configured to plug into sockets within the control assembly 902. Alternatively, the connector 910 may include at least one female socket configure for receiving male pins of the control assembly 902. The connectors 910 of the detection devices 104 are not limited to conductive male/female connectors. It is contemplated that the connectors 910 may include alternative means of transferring information, such as wireless transmitters, receivers, and/or transceivers.

The control assembly 902 may be further configured for removably coupling to at least one moderator assembly 904. The moderator assembly 904 may be configured for holding a volume of moderator material 109. The moderator assembly 904 may be further configured for receiving the detection devices 104 when coupled to the control assembly 902. In an embodiment, the moderator assembly 904 may include one or more slots 906 or alternative structural features configured for receiving the detection devices 104.

In some embodiments, the control assembly 902 may be configured for removably coupling to a plurality of moderator assemblies 904 allowing the moderator assemblies 904 to be selectively interchanged. In an embodiment, a first moderator assembly 904 may be interchanged with a second moderator assembly 904 at a predetermined or selected interval of time or use. In another embodiment, each moderator assembly 904 may be configured for holding a different volume of moderator material 109. For example, the moderator assembly 904 holding a first volume of moderator material 109 may be interchanged with another moderator assembly 904 holding a selected volume of moderator material 109.

Figure 10:
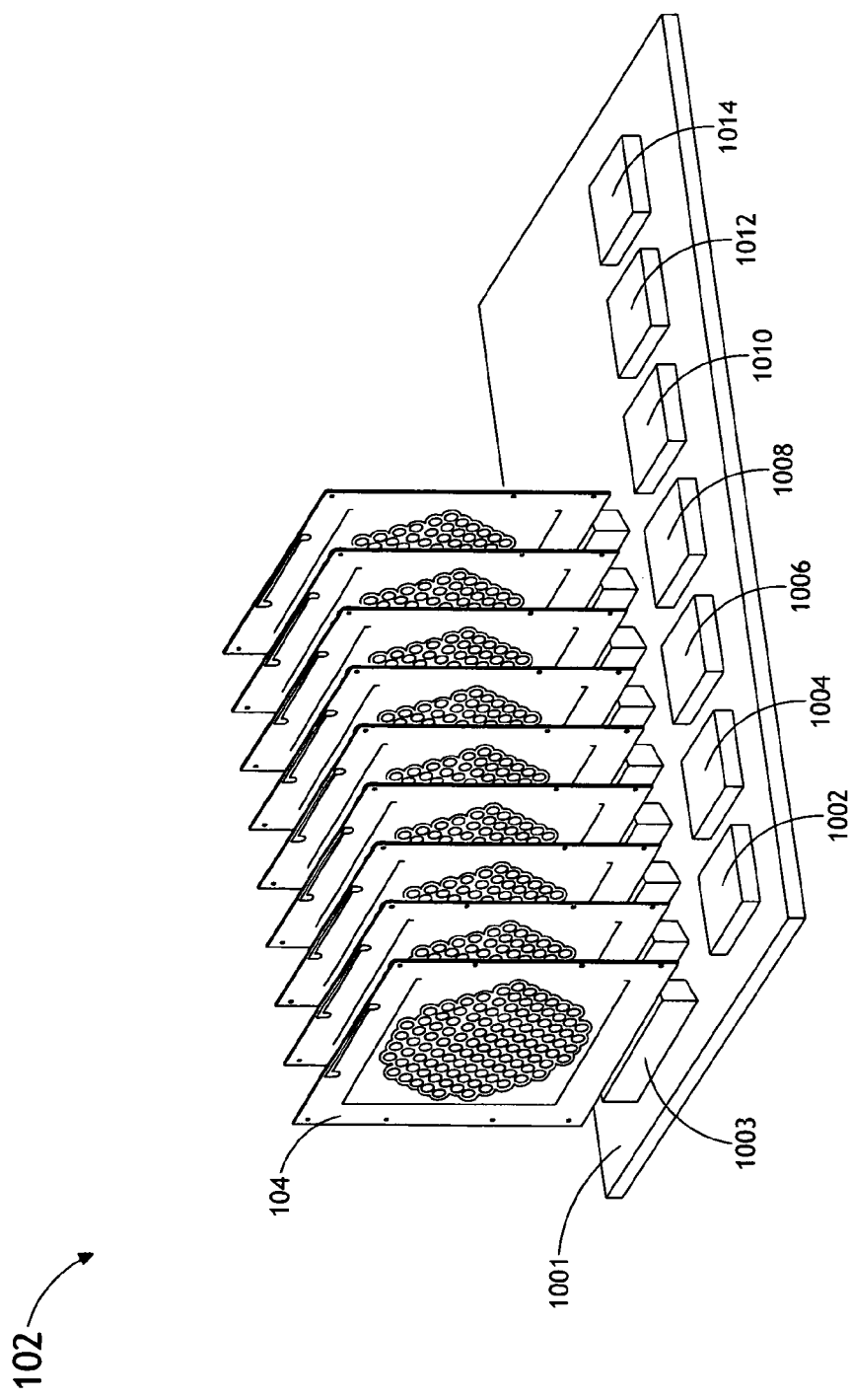

FIG. 10 illustrates a schematic view of a detector 102 of the detection device 100 coupled to various control and data acquisition circuitry elements 1002-1014. The circuitry elements 1002-1014 may correspond to switching circuitry, shaping circuitry, A/D circuitry, FPGA circuitry, mstFPGA circuitry, power circuitry, and communication circuitry respectively.

In a further embodiment, each of the plurality of neutron detection devices 104 may be communicatively coupled to the one or more processing elements 110 of the control system 108 via a data coupling (e.g., wireline data coupling or wireless data coupling). For example, each of the plurality of neutron detection devices 104 may transmit neutron detection response data to the one or more processors 110 of the control system 108 via a data connection. In another example, each of the plurality of neutron detection devices 104 may transmit neutron detection response data to a response detection database maintained in the memory 112 of the control system 108 via a data connection. In this regard, the neutron response data may be maintained in the memory 112 and retrieved at a later time by the one or more processing elements 110, allowing the system 100 to perform the various steps of the present invention at any time following interrogation of a given spatial region for neutron source existence and/or identification.

For the purposes of the present disclosure, the term "processing element" is broadly defined to encompass any device having data processing and/or logic capabilities. In one embodiment, the one or more processing elements 110 of the control system 108 may include, but are not limited to, one or more processors. In a further embodiment, the one or more processors are configured to execute program instructions from a memory medium 112. In this sense, the one or more processors may include any microprocessor-type device configured to execute software algorithms and/or instructions. In one embodiment, the one or more processors may consist of a desktop computer or other computer system (e.g., networked computer) configured to execute a program configured to operate the system 100, as described throughout the present disclosure. It should be recognized that the steps described throughout the present disclosure may be carried out by a single computer system or, alternatively, multiple computer systems.

Moreover, different subsystems of the system 100, such as the display device, the user interface device, individual detection devices, and the like, may include processing elements suitable for carrying out at least a portion of the steps described above. Therefore, the above description should not be interpreted as a limitation on the present invention but merely an illustration.

In one aspect, the one or more processing elements 110 of the control system 108 are configured to determine one or more energy characteristics of the neutrons 103 impinging on the detector 102. In one embodiment, the one or more processing elements 110 are configured to execute a set of program instructions suitable for carrying out a summation of one or more detection events as a function of one or more coordinate axes or convolution of axes in order to determine one or more energy characteristics of neutrons 103 impinging on the detector 102. In a further embodiment, the control system 108 may determine a neutron source type utilizing one or more of the determined one or more energy characteristics of the impinging neutrons 103. In another embodiment, the control system 108 may determine a dose of a neutron source utilizing one or more of the determined one or more energy characteristics of the impinging neutrons 103.

Applicants again note that the spatial position, within the moderating volume 109, that a neutron reaches thermal energy and is subsequently detected by a thermal neutron detector 102 is correlatable to the kinetic energy of neutrons 103 incident from a neutron source 101. It is further noted that in one or more of the various geometries described previously herein (e.g., parallelepiped geometry, cylindrical geometry, spherical geometry and the like) the spatial positions of the various number detected neutron capture events (e.g., the depth of the neutron detection device that is most frequently triggered) may be correlated to the energy spectrum of the incident neutrons. In turn, the control system 108 may determine a characteristic (e.g., source-type, dose, and the like) of an interrogated neutron source 101 based on the determined energy spectrum of the incident neutrons.

Applicants further note that the various embodiments of the one or more detectors 102, detection devices 104, and the detection elements 105 described throughout the present disclosure provide for the first time a true three-dimensional characterization of neutron thermalization in a moderating medium. The inclusion of characterization along multiple axes allows the system 100 of the present invention to generate unique neutron response functions, which aid in neutron energy characteristic analysis. Specifically, the present invention allows for the tracking of neutron thermalization to less than 1 cm$^3$. It is further noted the present invention allows for the thermalization tracking without significant perturbation to the thermalization process. In addition, the present invention allows for this resolution in a portable measurement device configuration. Further, the present invention provides a high intrinsic efficiency to fast neutrons, such as bare spontaneous fission emitters (e.g., $^{252}$Cf). The inclusion of characterization along additional axes allows the system 100 of the present invention to generate unique neutron measurement information, which improves neutron energy characteristic analysis over the prior art. Moreover, while the following description focuses on a few specific geometries, it is noted that the foregoing description of analysis procedures may be applied in the context of all of the configurations and geometries described previously herein.

In one embodiment, the control system 108 may generate a source "signature" or "fingerprint" utilizing the aggregated position dependent neutron thermalization data along one or more coordinate axes (e.g., x-y-z in Cartesian coordinate system; r, $\theta$, $\phi$ in spherical coordinate system; r, z, $\phi$ in cylindrical coordinate system, and the like) within the detector moderating volume 109. For example, the control system 108 may aggregate the responses measured by the multiple detection elements 105 of the detection devices 104 of the detector 102 in order to generate a source signature for a given neutron source measurement.

Figure 11:
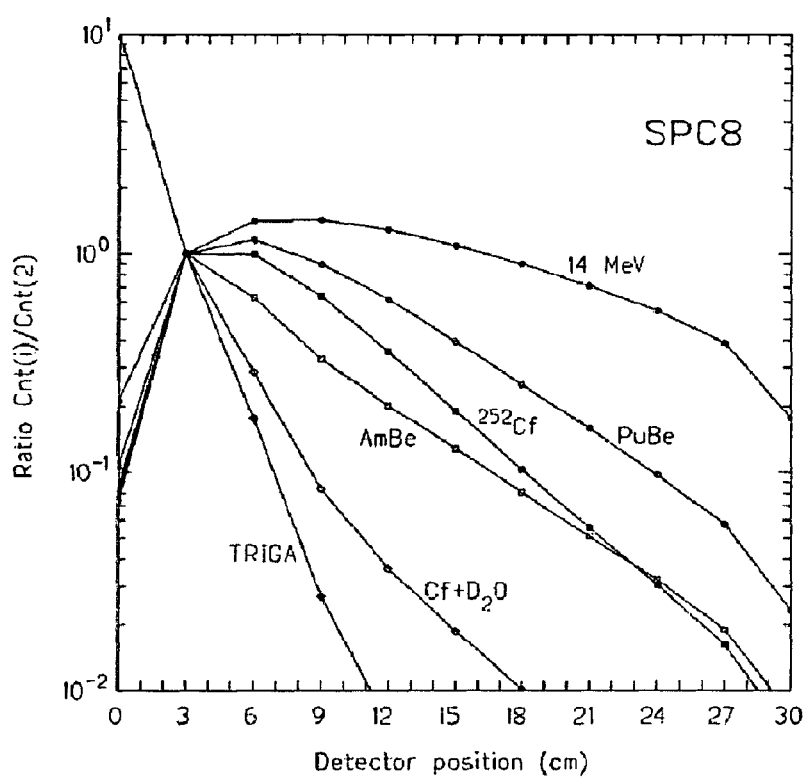
Figure 12:
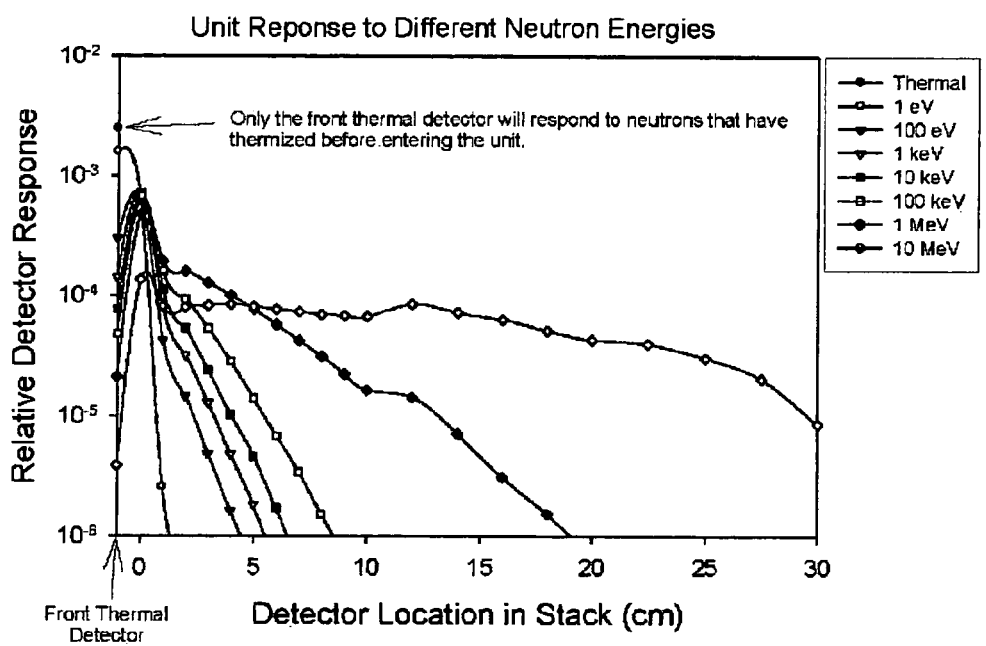

In another embodiment, the one or more processing elements 110 may generate one or more detector response libraries and maintain the one or more detector response libraries in the memory 112 of the control system 108. In some embodiments, the response library may be generated via a series of empirical processes. For example, the control system 108 may store various sets of normalized detector response data acquired by the system 100 during measurement of known neutron sources at known spatial positions and environments relative to the system 100. In other embodiments, the response library may be generated via simulation. For example, as shown in FIG. 11, Monte Carlo based calculations 1100 may be used to model the response of the detector 102 to various neutron sources (e.g., monoenergetic sources). Similarly, FIG. 12 depicts a series of Monte Carlo based calculations 1200 illustrating the predicted response of a given detector for a number of incident neutron energies (e.g., thermal neutrons energies through 10 MeV) as function of detection location within the detector. In this regard, the implemented model may be tuned to the specific structural characteristics of the detector 102 of the system 100. In this regard, the modeled response functions may take into account the spacing of detector devices 104, the thickness(es) of moderating material between various detector devices 104, the radius of detector devices 104, the depth of detector devices 104, the moderator type, the variability of the moderator make up throughout the detector 102, the absorber type, and the variability of the absorber make up throughout the detector 102 and etc.

In another embodiment, the one or more processing elements 110 are configured to compare the generated source signature to a detector response library 115 stored in the memory 112 of the control system 108. In this regard, the one or more processing elements 110 may compare the neutron detection curves (generated by aggregating the detection counts from each of the detection elements 105 of each of the detector devices 104) generated by an interrogated source 101 (i.e., an unknown potent neutron source) to the various response curves stored in the detector response library 115. The comparison between collected response data in the detector 102 and the response library 115 may be carried out in anyway known in the art.

In another embodiment, the comparison between collected response data and the response library 115 may be carried out utilizing a cross-correlation technique. In a first step, the number of relative neutrons (intensity) reaching thermal energy (on average) is collected as a function of one-, two-, or three-dimensional position within the moderating volume 109, and binned along one or more coordinate axes and/or one or more convolutions of the coordinate axes. In second step, the number of relative neutrons (intensity) reaching thermal energy (on average) originating from known sources and source configurations are calculated as a function of one-, two-, or three-dimensional position within the moderating volume 109, and binned along one or more coordinate axes and/or one or more convolutions of the coordinate axes. In a third step, the binned quantities from the first step are compared to the binned quantities of the second step by measuring a degree commonality (e.g., a score of commonality is assigned for each comparison) for the each of the known source/source configurations. In a fourth step, the matching neutron source and configuration is identified utilizing the highest degree of commonality found in step 3.

In the case of a cylindrical geometry, such as that depicted in FIG. 1C-1E, the response or intensity of neutron counts from the detector devices 104 (or detection devices 105 in a segmented or pixelated configuration) as a function of the axial depth in the moderating detector 102 is a function of the incident neutron spectrum. In this regard, lower energy spectral neutrons are preferentially detected in the first few detector devices 102, while higher energy spectral neutrons tend to penetrate deeper along the axial length of the detector 102, and, resultantly are detected in "deeper" detection devices 102. Applicants note that one complicating factor is the likely presence of cosmic-ray induced spallation neutrons (or some other masking/convoluting neutron source), which may also create a unique response in the detector 102. In order to determine the magnitude of the neutron source 101 strength in the presence of neutrons associated with the cosmic background, as well as determine the source's identity, the source's environment, or local configuration of the source 101, cross-correlation analysis may be utilized. It is further noted that source strength may also be implemented in settings where cosmic background neutrons are not present. For the purposes of the present disclosure, "cross-correlation" represents a measure of similarity between two or more waveforms and is used for pattern recognition. In a further embodiment, the control system 108 may apply a normalized cross-correlation procedure with an output score or coefficient (e.g., Pearson product-moment correlation coefficient). The normalized cross-correlation procedure of the present invention may include convolving a measured energy (E) and a reference response (R) of the detector 102 by summing the product of the normalized measured and reference responses from each data point (i.e., signal from the $i^{th}$ detector along some coordinate axis or the signal from some $i^{th}$ and $j^{th}$ detector along two or more coordinate axes or any combination of detectors that yields a unique signature that may be compared against in the reference library). It is further noted that normalization is accomplished by subtracting the mean from the measured or reference response and dividing by the standard deviation of the mean. The resulting normalized functions are multiplied by each other and summed. The result is a cross correlation score for a given "guessed" reference response R. The cross-correlation score for a given response R is given by:

$$\text{Cross Correlation} = \frac{1}{N-1} \sum_{1}^{n} \frac{(E_i - \overline{E})}{\sigma_E} * \frac{(R_i - \overline{R})}{\sigma_R}$$

where $E_i$ is the experimentally measured response function for the $i^{th}$ diode; $\overline{E}$ is the mean of the measured response data; $R_i$ is a "guessed" response based upon reference data; $\overline{R}$ is the mean of the guessed response data; $\sigma_E$, $\sigma_R$ are the standard deviations of the two functions; and N is the number of detector devices 104 (e.g., diodes) in the detector 102.

In a further embodiment, in order to determine the source type and source magnitude, trial spectrometer responses R are generated from modeled reference spectra (e.g., MCNPX reference spectra). First, a response function for a particular source (e.g., $^{252}$Cf) is selected. The response of the detector 102 to this source is added to the cosmic response starting with the source 101 being some small fraction of the cosmic background (say 1%) and a cross-correlation factor is calculated. The source 101 magnitude is incremented, producing a new trial response R and the cross-correlation is calculated again. This process is continued up to some arbitrarily large amount of source strength compared to cosmic. After determining cross-correlation factors for one assumed source, the process is repeated for a different (e.g. AmBe) source. The result is a series of cross-correlation factors as a function of source type and source strength. The highest cross-correlation factor predicts the best match of source type and strength to the experimental measured E.

In another embodiment, the incident neutron spectra may be determined by unfolding the measured data in light of the detector response functions. In this regard, any unfolding technique known in the art may be utilized in conjunction with the detector response library 115 to deduce one or more energy characteristics associated with the neutrons 103 impinging on the detector. Applicants note that in one embodiment in executing the one or more unfolding process the control system 108 may utilize as an input a measurement matrix N (as measured by the various detection elements 105) and a response matrix M (stored in the memory 112 of the control system 108). In this regard, the control system 108 may invert the relationship given by N=RI in order to determine the incident neutron spectra I.

For instance, unfolding techniques may be used to determine the energy distribution of the impinging neutrons 103, the peak energy of the impinging neutrons 103, the high-energy tail of the neutron 103 energy distribution. Utilizing these or other energy characteristics, the control system 108 may then deduce the unknown interrogated neutron source 101. It is recognized herein that various mathematical and modeling principles may be implemented in order to "unfold" the measured data in light of the detector response functions. For example, the unfolding operations may include, but are not limited to, inverse Monte Carlo techniques and regularization techniques.

In one implementation, in a cylindrical neutron detection system 100, as shown in FIG. 1E, in a setting where incident neutrons impinge on the detector 102 in a substantially parallel manner (i.e., in axial direction), the control system 108 of the neutron detection system 100 may be calibrated in terms of depth using a library of detector responses for multiple neutron sources (e.g., acquired through measurement of known sources (e.g., monoenergetic, bare spontaneous fission (252-Cf), moderated spontaneous fission, α,n sources (AmBe), etc.) or detector response modeling), as described above. After building up appropriate calibration data sets, and thus correlating the penetration depth with actual incident neutron energy using the detector response library 115, the cylindrical neutron detection system 100 may then be used to measure quantities proportional to or correlatable with the energy of incident neutrons. Moreover, by comparing the measured penetration depth data (flux vs. depth or intensity vs. depth) to the calibration data from the neutrons from the known neutron sources (flux vs. depth or intensity vs. depth for known energy), a spectrum (flux vs. energy or intensity vs. energy) can be deduced and it is possible to then further deduce the type of neutron source and/or dose using the methods described above. It is further contemplated that for the purposes described in the present disclosure the terms "flux" and "intensity" are substantially interchangeable as intensity represents the total number of neutrons that have impinged at a given detector element, whereas flux represents the total number of impinging neutrons per unit area per unit of time. It should be recognized by those skilled in the art that an intensity value is readily converted to a flux value and vice-versa based on the length of time of a given measurement.

In another implementation, a cylindrically symmetric shaped neutron detection system 100, as shown in FIG. 1E, may be utilized to measure the energy spectrum of incident neutrons impinging on all faces of the neutron detection system 100. One skilled in the art will appreciate that in a cylindrical geometry, assuming isotropic incidence of impinging neutrons 103, the depth at which a number of detected neutron capture events is maximum (i.e., the depth of the neutron detection device that is most frequently triggered) can be correlated with the energy of the incident neutrons 103. To accomplish the depth resolution for isotropic incidence on the cylindrical geometry, both a radial and axial dependence of intensity must be determined. While the axial dependencies may be determined in a manner similar to that described in the preceding description, the radial dependence may be formed by a number of neutron detection elements 105 (e.g., elements 105 shown in FIG. 1E), which create a pixilated or segmented effect in each detector device 104. For example, radial dependence may be accomplished utilizing a hexagonal array arrangement (see FIG. 1E), a dot array arrangement (see FIG. 1L), a square array arrangement (see FIG. 1F), a concentric ring arrangement (see. FIG. 1M). Each of these arrangements allow for the control system 108 to determine the off-axis position of a neutron capture event in a given detector device 104. In a manner described in the preceding section, both radial and axial directions may require calibration by known neutron sources, either through calibration measurements or calibration modeling, in order to provide the moderator-energy correlation.

Applicants note that it is desirable to provide a detector 102 having a radius larger than the mean free path of the most energetic incident neutron in order to reduce the likelihood of the neutron passing through to the opposite side of the detector device 104, thereby polluting the intensity measurement.

In another implementation, a rectangular or square shaped neutron detection system 100, as shown in FIG. 1F, may be utilized to measure the energy spectrum of parallel incident neutrons impinging on the detector 102. As in the case for cylindrical geometry, the control system 108 of the neutron detection system 100 may be calibrated in terms of depth using multiple known neutron sources (e.g., monoenergetic neutron sources), as described above. After building up appropriate calibration data sets, and thus correlating the penetration depth with actual incident neutron energy using the detector response library 115, the rectangular neutron detection system 100 may then be used to measure the energy spectrum of incident neutrons. Again, by comparing the measured penetration depth data to the calibration data from the neutrons from the known neutron sources (or modeling results), a spectrum can be deduced, allowing for the deduction of the type of neutron source 101.

In another implementation, a spherically symmetric shaped neutron detection system 100, as shown in FIG. 1G, may be utilized to measure the energy spectrum of parallel incident neutrons impinging normal to any tangent on the sphere. One skilled in the art will appreciate that in the spherical geometry, assuming parallel incidence of impinging neutrons, the radial depth at which a number of detected neutron capture events is maximum in less than one hemisphere, is correlatable to the energy of the incident neutrons. To accomplish the depth resolution for parallel incidence in the spherical geometry, the radial, phi, and theta dependence of the intensity may be determined. To provide the greatest spectroscopic clarity, the sphere radius should be greater than the macroscopic mean free path of the most energetic neutron to be detected, but not so large that the most energetic neutrons terminate outside the quarter radius. Detection element 105 pixilation may be formed as described in preceding description. It is further noted, that the spherically shaped neutron detection system 100 may be implemented to measure the energy spectrum of parallel incident neutrons (i.e., neutrons moving substantially along the polar axis of sphere) on the detector 102.

In another implemenation, a spherically symmetric shaped neutron detection system 100 may be implemented to measure the energy spectrum of omnidirectional neutrons 103. One skilled in the art will appreciate that in a spherical geometry, assuming omnidirectional incidence of impinging neutrons, the radial depth at which a number of detected neutron capture events is maximum (i.e., the depth of the neutron detection device that is most frequently triggered) may be correlated with the energy of the incident neutrons. The volume of elements and moderator-energy correlation calibration may be completed as described above.

It is further contemplated that the detection system geometry and symmetry described above may be extended to the conical, pyramidal, and other rotationally and/or mirror plane invariant symmetries in order to obtain a coordinate dependence of the intensity from which incident neutron energy may be determined.

In another embodiment of the present invention, the one or more processing elements 110 are configured to execute a set of program instructions suitable for carrying out a dose determination algorithm in order to determine a dose of neutrons 103 impinging on the detector 102. In this regard, the neutron detection system 100 of the present invention may be configured as a dosimeter (i.e., REM meter).

In one embodiment, the detection system 100 may be configured as a neutron dosimeter by utilizing volumetric identification of fast neutron thermalization in the context of forming a semiconductor-based Bonner-like neutron detector, such that the entire moderating volume is sampled locally for thermal neutrons. Such volumetric resolution is possible through the layering of weakly perturbing and pixilated high thermal efficiency semiconductor neutron detection devices 104 into a neutron moderator 109. The use of multiple detection devices 104 provides detailed information concerning the spectral characteristics of the neutron field, critical to determining dose conversion factors which are strongly dependent upon incident neutron energy.

Applicants note that "dose" may be determined via one of more dose calculation algorithms executed by the control system 108. In one embodiment, since the response of each detection element 105 is unique and varies throughout the detector volume of the detector 102, the response of the various elements 105 may be unfolded in order to provide an estimate of the incident neutron 103 spectrum. In turn, the incident neutron spectrum may be converted to dose via a flux-to-dose dose equivalent relationship. In another embodiment, the control system 108 may superimpose the linear combinations of the detector response functions to duplicate the unique flux-to-dose conversion function. The response of each detector element 105 may be multiplied by the linear combination coefficients and summed to provide their individual contributions to the total dose. In yet another embodiment, a third algorithm may make use of the fact that neutron spectra in applied dosimetry environments are typically perturbations on a characteristic spectrum of fast neutrons around 1-10 MeV, a slowing down region in the 1 eV to 1 keV range and a thermal neutron component. In this regard, the system 100 may utilize a library of stored neutron spectra along with the corresponding dose equivalents for these spectra. The control system 108 may determine the most likely neutron spectral field (and thus dose) by a cross-correlation evaluation of the individual detection element 105 responses to that of the library of responses from the assumed spectra.

In one embodiment, the neutron detection system 100 may be configured to resolve ambient neutron dose equivalent spanning the thermal to 15 MeV range. In one embodiment, the neutron detection system 100 may simultaneously count thermalized neutrons by weakly perturbing and high thermal efficiency solid state neutron detector devices 104. It is noted that the utilization of multiple detector devices 104 and moderator material 109 arranged along an axis of symmetry (e.g., long axis of a cylinder) with known neutron-slowing properties allows for the construction of a linear combination of responses that approximate the ambient dose equivalent.

Those skilled in the art should recognize that the operational quantity devised by the International Commission on Radiation Units and Measurement (ICRU) for operational radiation field measurements is the ambient dose equivalent, denoted H*(10) and defined as the effective dose equivalent at a point of interest in a radiation field which would be generated at a 10 mm depth in a superimposed tissue-equivalent sphere. For the case of monoenergetic neutrons at energy E, the ambient dose equivalent is then given by:

$$H^*(10) = \Phi_E h_{cc,E}$$

where $\Phi_E$ is the mono-energetic neutron fluence and $h_{cc,E}$ is a neutron dose-equivalent conversion value specific to the energy of the incident neutrons that accounts for both the quantity of energy deposition as well as the corresponding RBE implications. It is noted herein that detailed knowledge of the energy dependent ambient neutron dose equivalent and spectral fluence is necessary for accurate dosimetric calculations. Note that $h_{cc,E}$ is a highly nonlinear function in energy in which relatively low equivalent dose per neutron (~10 pSv-cm2) is observed at energies below 10 keV, followed by a nearly two order-of-magnitude increase (~600 pSv-cm2) between 10 keV and 1 MeV.

Figure 13A:
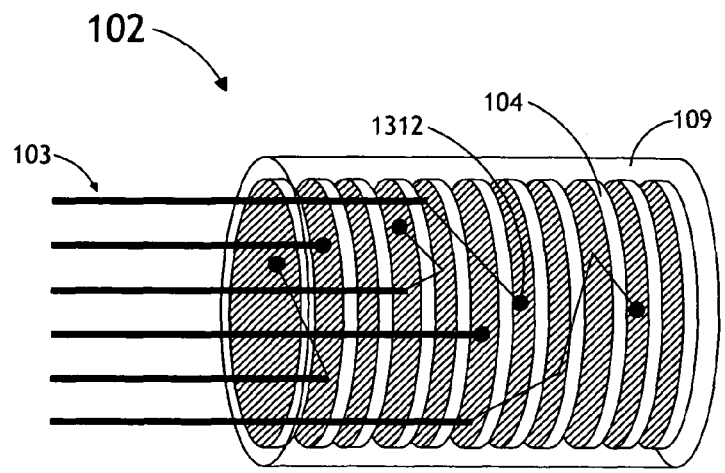

Due to the ability of the system 100 to determine the thermalization of neutrons volumetrically (<1 cm3) along one or more geometric coordinate axes in real-time, the system 100 may be used to accurately accommodate the nonlinear shape of the ambient dose equivalent conversion curve, such that the neutron energy correction factor can be adjusted electronically. For the case of free neutrons travelling in parallel, this task can be accomplished by stacking high thermal efficiency detection devices (or comparable weakly volumetric perturbing detection devices), into an axially symmetric moderator geometry, like that the detector 102 having right cylindrical geometry shown in FIG. 13A, as described throughout the present disclosure. In an alternative embodiment, the detection devices 104 may include detection devices being comparably weakly perturbing to the overall volume and having at least one-dimensional position sensitivity. In the case of the detector 102 depicted in FIG. 13A, it is assumed that the neutrons are parallel and incident on the front face of the cylinder as shown in FIG. 13A. In further embodiments, as discussed previously herein, the detector 102 may be covered in both $^{113}$Cd and a concentric moderator to prevent thermal and epi-thermal neutrons, incident from the sides or back from being detected (i.e., a camera geometry) within the detector volume. Conversely, if there were very few neutrons and they were incident from all directions, a spherical geometry with radial dependence may be implemented.

Figure 13B:
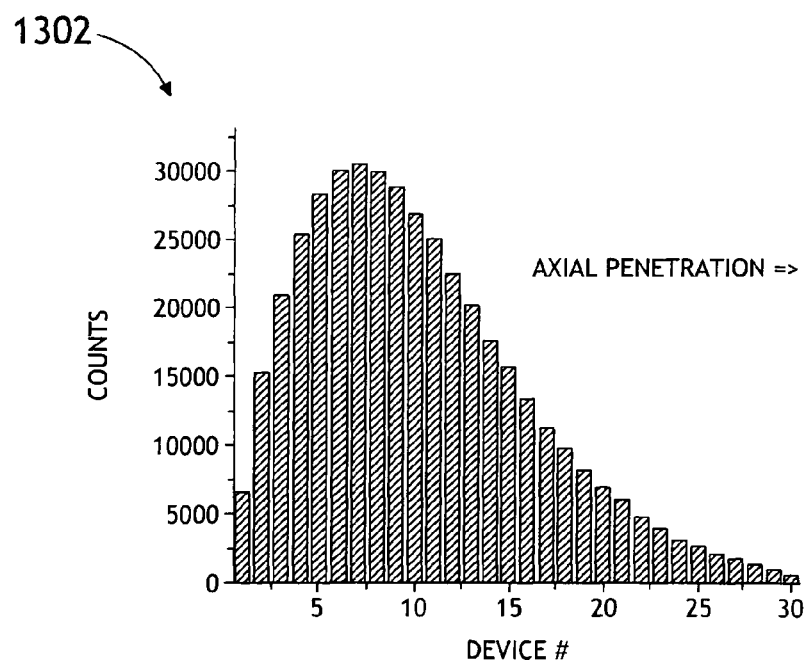

In one embodiment, a one-dimensional axial binning scheme is presented in the form of the histogram 1302 in FIG. 13B, representative of detected neutrons 1312 and is unique to the energy and intensity of the given incident neutron source 101 (unmoderated $^{252}$Cf in the case illustrated). The thickness/volume of the detector 102 is defined by the detection devices 104 and any necessary electronics that are positioned in the neutron path (e.g., preamplifiers, fiberglass boards, etc.). In one embodiment, specifications for thermal efficiency and large detector area may be met utilizing the indirect conversion MSNDs described previously herein. In one embodiment, the MSND-based devices may utilize the thermal neutron capture with $^6$Li (938 barns) to produce at least twenty percent thermal neutron detection efficiency.

The minimal perturbation of each detector to the moderation process, combined with the high thermal-efficiency of each detection device 104, permits the investigation of an individual device's output with respect to the corresponding degree of observed moderator penetration. Energy dependence considerations allow for the delivery of distinct efficiency vs. energy curves as a function of moderator thickness that closely resembles the acquisition from collections of Bonner sphere configurations. The availability of n simultaneous measurements from n detectors with unique Bonner-like response functions permits revision of its REM meter's dose response curve to:

$$M = \int_0^\infty \Phi_0(E) f(d_{cc,1}(E) \ldots, d d_{cc,n}(E)) dE$$

where the single detector response curve of a conventional REM meter is replaced by a function of multiple response curves, f, to permit more accurate matching to $h_{cc,E}$. In one embodiment, a linear combination of the individual Bonner-like response functions may be used to force the dosimeter's (i.e., the detector 102) overall response function to mimic the shape of the provided absorbed dose-equivalent curve such that $$f(d_{cc,1}(E), \ldots, d_{cc,n}(E)) = h_{cc}(E) = g_1 d_{cc,1} + g_2 d_{cc,1} + \ldots + g_n d_{cc,n}$$

where $g_i$ is the gain corresponding to the ith detector's response function, $d_{cc,i}$. Applicants note that it is this gain that allows for the electronic matching to any dose equivalent curve. In another embodiment, a collection of measurements from m monoenergetic sources spanning the pertinent energy range may then be used to populate an m by n matrix, B, where the corresponding $h_{cc,E}$ values populate a m by 1 column matrix, y. As such, the discrete Fredholm equation may be expressed as:

$$y_{(m,1)} = B_{(m,n)} G_{(n,1)}$$

where G is the gain matrix containing n optimal multiplier values ($g_1$-$g_n$). Assuming an overdetermined system, identification of the optimal gain values is now accomplished by minimization of a "cost" function, selected for this case to be the sum of the square of the residuals:

$$J = [y_{(m,1)} - B_{(m,n)} G_{(n,1)}]^T R_{(m,m)}^{-1} [y_{(m,1)} - B_{(m,n)} G_{(m,1)}]$$

where R is a diagonal matrix populated by the desired weights, for this case the inverse square values of y. Assuming B is invertible:

$$G_{(n,1)} = [B_{(n,m)}^T R_{(m,m)}^{-1} B_{(m,n)}]^{-1} B_{(n,m)}^T R_{(m,m)}^{-1} y_{(m,1)}$$

Once the gain values are determined, the ambient dose equivalent due to a cumulative detector response can be determined from a series of backward substitutions as:

$$H^*(10) = C \times [d_1 g_1 + d_2 g_2 + \ldots + d_n g_n] (mrem)$$

where $d_i$ is the number of counts measured on the ith detector. In this regard, the control system 108 may apply this relationship to determine the ambient dose equivalent using neutron counts as measured by the various detector devices 104 as an input. Applicants further note that following model identification, the dose equivalent, or dose-rate, for any ambient measurement/spectra can be calculated from the same linear combination technique now performed on the total counts measured by each detector.

In another embodiment of the present invention, the one or more processing elements 110 of the control system 108 are configured to execute a set of program instructions suitable for determining one or more characteristics associated with the neutrons 103 impinging on the detector 102. In one embodiment, reference response functions may be stored in memory 112 of the control system 108. In one embodiment, the response functions may include a reference for spectral shape (i.e., neutron intensity dependence along one or more coordinate axes). In another embodiment, the response function may include a reference for neutron magnitude (e.g., raw neutron fluence, flux dosimetric magnitude, and the like). In a first step, the control system 108 may normalize both reference and measured responses for the purpose of the cross-correlation or desired template matching analysis method. Applicant notes that the previously described cross-correlation approach may be applied herein. Then, after a best fit has been determined, a magnitude (e.g., dose, dose rate, fluence or flux) to total counts relationship of the reference may be used to provide the incident dose, dose rate, fluence or flux for the integral number of counts detected in the given measurement by the detector 102.

FIGS. 14A-14F illustrate a Variable Moderator Thickness (VMT) Neutron Spectrometer 1400 contained in a compact and portable form. The spectrometer may include a thermal neutron detector 1414 such as, but not limited to, thin-film coated semiconductor neutron detectors, microstructured semiconductor neutron detectors, gas-filled neutron detectors, coated wall neutron detectors, coated fin neutron detectors, and the like. In one embodiment, the thermal neutron detector 1414 may include a microstructured semiconductor neutron detector, such as those produced by the Semiconductor Materials and Radiological Technologies (S.M.A.R.T.) Laboratory at Kansas State University. The neutron detector 1414 relies on neutron moderator material 1418 between it and the neutron source. The thickness of moderator material 1418 present in the neutron moderation section 1416 may be variable. In an embodiment, the thickness may be controlled by an actuator, such as an onboard motor and piston system 1404A, 1404B or another on board control system housed in an inert casing such as, the outer shell described herein.

As moderator material 1418 is added or removed from the neutron moderation section 1416 the number of neutron scatters that occur within the neutron moderator material 1418 changes. The more moderator material 1418 is present within the neutron moderation section 1416, the more scatters that will occur and therefore higher energy neutrons will be down scattered into the thermal energy ranges. This allows for detection of high energy incident neutrons. If the energy of neutrons emitted by a source is unknown, then an investigation can be made by varying the amount of moderator material 1418 in the neutron moderation section 1416 and taking several counts. The number of counts recorded at each iteration may be tallied into calibrated energy bins and as more iterations are made, a spectrum of neutron energies may be resolved.

The spectrometer 1400 may be partially or entirely contained in an outer shell 1402A, 1402B, 1406, 1408, and 1416. The strength of the shell material may allow for transport of the device in harsh environments. For example, the outer shell 1402A, 1402B, 1406, 1408, and 1416 that serves as the container for most of the functioning neutron spectrometer can be manufactured from materials that are resistive to corrosion, strong, low cost, and/or readily available including, but not limited to, aluminum, graphite, titanium, stainless steel, and the like. In some embodiments, the materials may have low total neutron cross-sections. A low total neutron cross-section may allow for the greatest number of neutrons to stream through the shell, improving counting statistics and accuracy of an investigation. Another advantage of a tow total neutron cross-section is the reduction of (n,X) reactions and therefore less noise in a neutron detector 1414. The outer shell may contain moderator material 1418, moderator material drive systems 1406 neutron shielding apparatuses 1410 and 1412, and the neutron detector 1414. In an embodiment, the shell 1402A, 1402B, 1406, 1408, and 1416 may be compartmentalized into three main chambers including, the neutron moderation section 1416, the neutron detector and moderator drive component housing 1408 and the excess moderator reservoir 1406. The three compartments may be sealed together with the neutron moderation section 1416 and the excess moderator reservoir 1406 connected through a pipe in order to allow for moderator flow from one to the other.

Figure 14A:
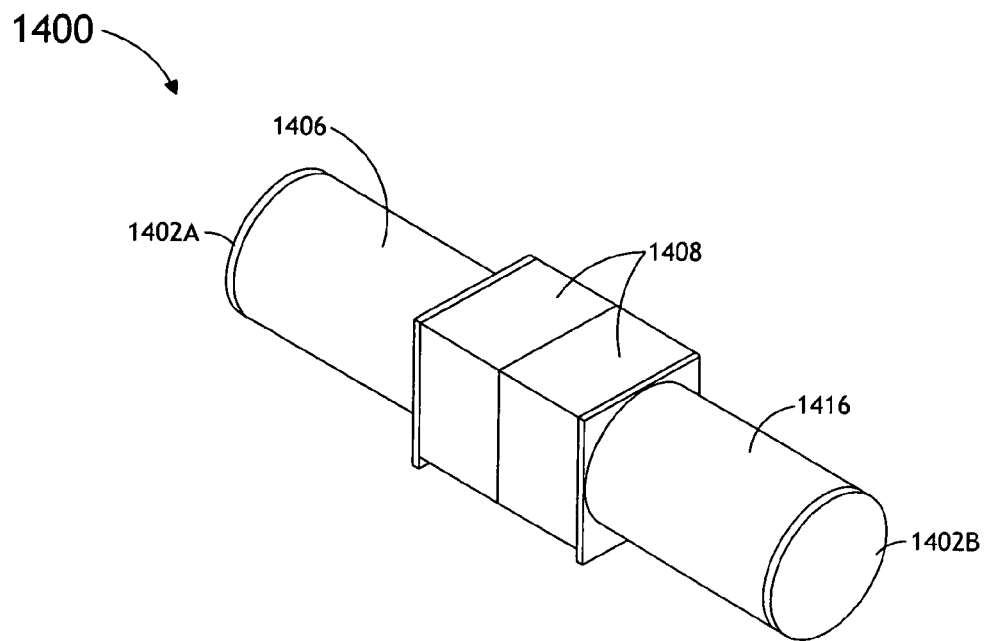
Figure 14B:
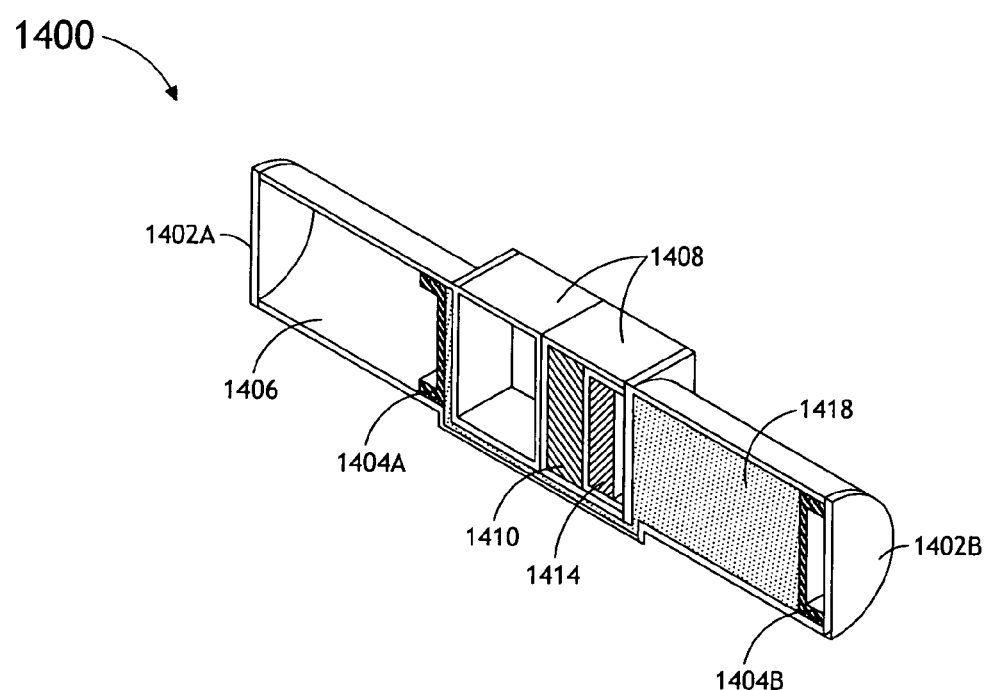
Figure 14C:
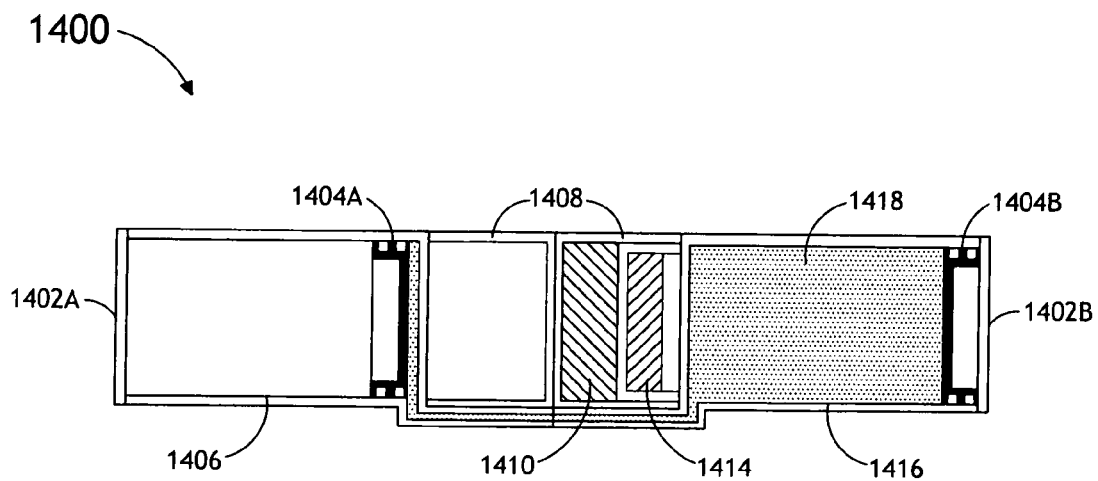
Figure 14D:
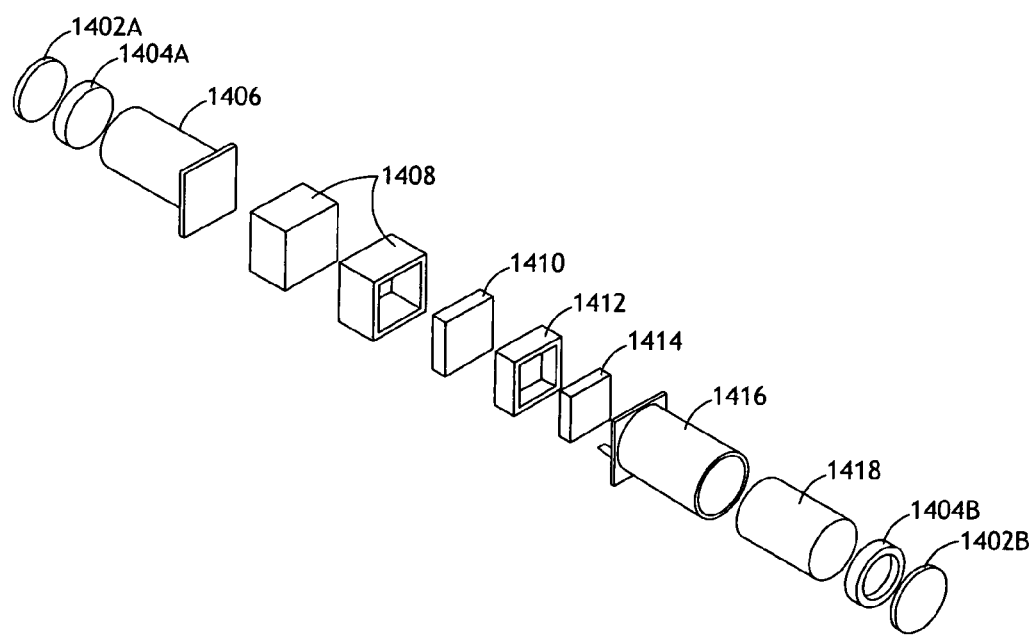

Referring to FIG. 14D, end caps 1402A, 1402B may be disposed at the front and rear of the neutron spectrometer device. The end caps 1402A, 1402B primarily serve as a means of sealing the neutron moderation section 1416 and the excess moderator reservoir 1406, thus retaining the moderator material 1418. In an embodiment, the end caps 1402A, 1402B are designed to allow for optimum streaming of incident neutrons of all energies. The end caps 1402A, 1402B may serve an additional purpose of restraining the moderator pistons 1404A, 1404B found in both the neutron moderation section 1416 and the excess moderator reservoir 1406.

The moderator pistons 1404A, 1404B serve as the driving force that moves moderator material 1418 to and from the excess moderator reservoir 1406 and the neutron moderation section 1416. Depending on viscosity of the neutron moderator 1418, it may only be necessary to drive one moderator piston 1404A, 1404B since force may be transferred pneumatically to the second moderator piston 1404A, 1404B. Several methods of pneumatically transferring force include, but are not limited to, pumping air or other non-neutron-attenuating materials behind a moderator piston 1404A, 1404B, pulling a vacuum behind a moderator piston 1404A, 1404B, a worm screw and motor drive system, or a magnetic coupling system. In some embodiments, two moderator pistons 1404A, 1404B may be utilized to move moderator material 1418 back and forth allowing the moderator material 1418 to uniformly occupy a constant volume and the neutron detector 1414 of the spectrometer 1400 to remain uniformly filled. The moderator pistons 1404A, 1404B may be configured to remain upright indefinitely. For example, at least one moderator piston 1404A, 1404B may be thick enough to prevent from being physically unseated. The moderator pistons 1404A, 1404B may be hollowed out in order to reduce their influence on the neutron flux through the neutron detector 1414, while maintaining high strength. Accordingly, minimal neutron attenuation by the non-detection and moderation components may be achieved. Alternative means of changing the amount of moderator material 1418 present in the neutron moderation section 1416 may include, but are not limited to, an inflatable diaphragm 1420 (see FIGS. 14E and 14F), a viscous boundary layer separation of moderation fluids, magnetic confinement of magnetic moderator materials, or pressurization (and therefore increased density) of gasses.

The excess moderator reservoir 1406 may be stored behind the neutron detector 1414 in order to limit back scattering of neutrons into the detector 1414 or back into the neutron moderation section 1416 causing false counts. The excess moderator reservoir 1406 may be configured for safely storing moderator material 1418 while not in use by the spectrometer 1400. In one embodiment, the excess moderator reservoir 1406 may be part of the overall system in order to facilitate mobility of the spectrometer 1400. For simplicity, the excess moderator reservoir 1406 may mirror the neutron moderation section 1416.

The primary component shell 1408 may serve as the housing for any drive components used to move the moderator pistons 1404A, 1404B and may also contain the entire neutron detector 1414, including the rear shielding 1410, 1412. The rear shielding 1410, 1412 may include two separate components, each designed to reduce the number of false counts tallied by the neutron detector 1414. A thermalizing plate 1410 may be configured to reduce thermalized neutrons and capture higher-energy neutrons that attempt to enter the neutron detector 1414 through the rear, either through back scattering from stored moderator material 1418 or from another neutron source. The thermalizing plate 1410 may include, but is not limited to, borated polyethylene, iron, or steel. A thermal neutron absorbing sleeve 1412 may be configured to act as an alternative or additional defense against thermalized neutrons entering the neutron detector 1414 from any direction other than from the front of the neutron detector 1414, thus reducing false counts. The sleeve 1412 may include, but is not limited to, cadmium or borated polyethylene, or any similar thermal neutron absorber.

The neutron detector 1414 may be configured to detect thermalized neutrons and may consist of any number of detectors including, but not limited to, thin-film coated semiconductor neutron detectors, microstructured semiconductor neutron detectors, gas-filled neutron detectors, coated wall neutron detectors, coated fin neutron detectors, and the like. In one embodiment, the neutron detector 1414 includes a microstructured semiconductor neutron detector, such as those produced by the Semiconductor Materials and Radiological Technologies (S.M.A.R.T.) Laboratory at Kansas State University. The selected neutron detector 1414 may have advantageous qualities such as, but not limited to, low power requirement for operation, ruggedness, and modular design. The selected neutron detector 1414 may further include high neutron detection efficiency allowing for good counting statistics from relatively short investigation times.

The neutron moderation section 1414 houses the moderator material 1418 used for thermalization of neutrons incident on the end of the tube. The amount of moderator material within the tube can be varied by the moderator pistons 1404A, 1404B, which in turn varies the thickness of moderator material 1418 present in front of the neutron detector 1414 and thus the path length that an incident neutron is required to travel to the neutron detector 1414 is increased. This allows for varied neutron thermalization within the neutron detector 1414 in a precise and controlled manner. Accordingly, knowledge of the amount of neutron moderator material 1418 present in front of the neutron detector 1414, the type of moderator material 1418, and the number of counts recorded may be utilized to form a histogram detailing the spectrum of neutron energies emitted by the source.

The neutron moderator material 1418 may include, but is not limited to, fluid, such as gas or liquid, or a granular or powder material capable of flowing in a continuously variable manner. A continuously variable design may allow for an infinite number of discreet measurements, limited only by the system driving the moderator material 1418. In some embodiments, the neutron moderator material 1418 may have a high neutron scatter cross-section and a low neutron absorption cross-section to allow for thermalization, but not absorption, of all energies of neutrons. In some embodiments, the neutron moderator material 1418 may include water or hydrocarbons.

Neutrons of interest may enter the neutron moderation section 1416 from the front of the detector. Therefore the amount of moderator material 1418 that the neutrons must past through can be controlled and calibrated as previously discussed. Neutrons incident from any portion of the spectrometer 1400 other than the aperture may be shielded. As neutrons enter into the aperture they may pass through any void in the neutron moderation section 1416 until they reach the neutron moderator material 1418. Depending on the energy of the neutrons, they may begin to scatter with a higher probability of scattering forward than backwards. This allows for the thermalization of higher energy neutrons for detection by the neutron detector 1414. Higher energy neutrons may scatter through more neutron moderator material 1418 than lower energy neutrons. Neutrons with high enough energy may travel through the neutron moderator material and into the neutron detector 1414 where, if they have been fully thermalized, they will be tallied. Lower energy neutrons may be attenuated by the same or a similar amount of neutron moderator material 1418, thus not contributing to the tally.

In an example of an investigation, neutrons from each of the four primary energy bins are represented; thermal neutrons (0 to 0.1 eV), epithermal neutrons (0.1 eV to 100 eV), intermediate neutrons (100 eV to 1 MeV), and fast neutrons (+1 MeV). When the neutron moderation section 1416 is completely filled with neutron moderator material 1418, the various neutrons enter into the aperture of the spectrometer 1400, where only the high-energy neutrons may be capable of making it through the moderator material 1418 and into the detector 1414. When the neutron moderation section 1416 is partially filled, as neutron moderator material 1418 is reduced, lower energy neutrons may become able to travel through the moderator material 1418 and into the neutron detector 1414. When a minimal amount of neutron moderator material 1418 is present, thermal neutrons may be tallied by the neutron detector device 1414. As previously discussed, the neutron detector 1414 may be protected by the rear shielding 1410, 1412 from backscattering neutrons of various energies.

Figure 14E:
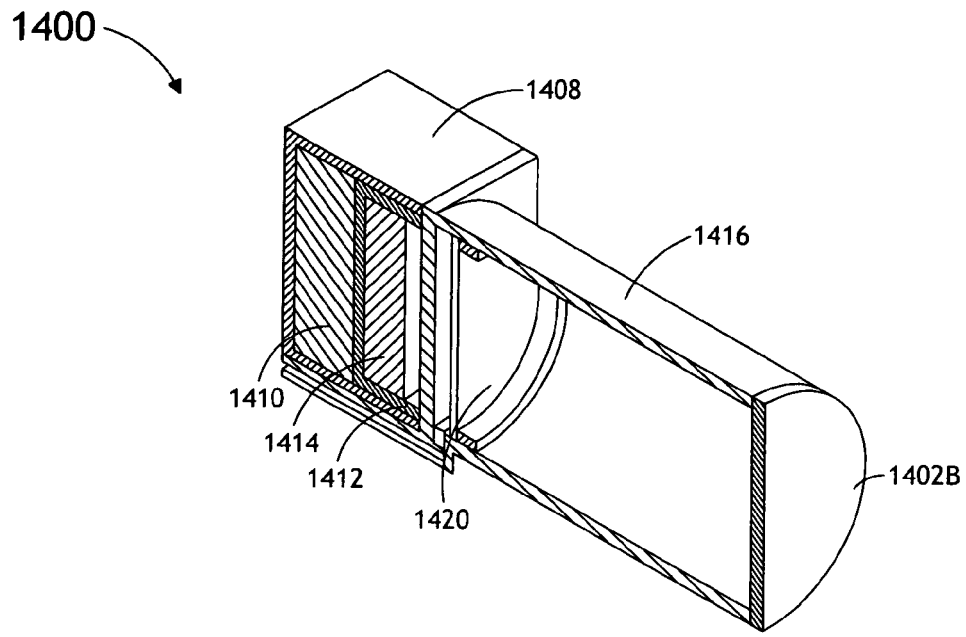
Figure 14F:
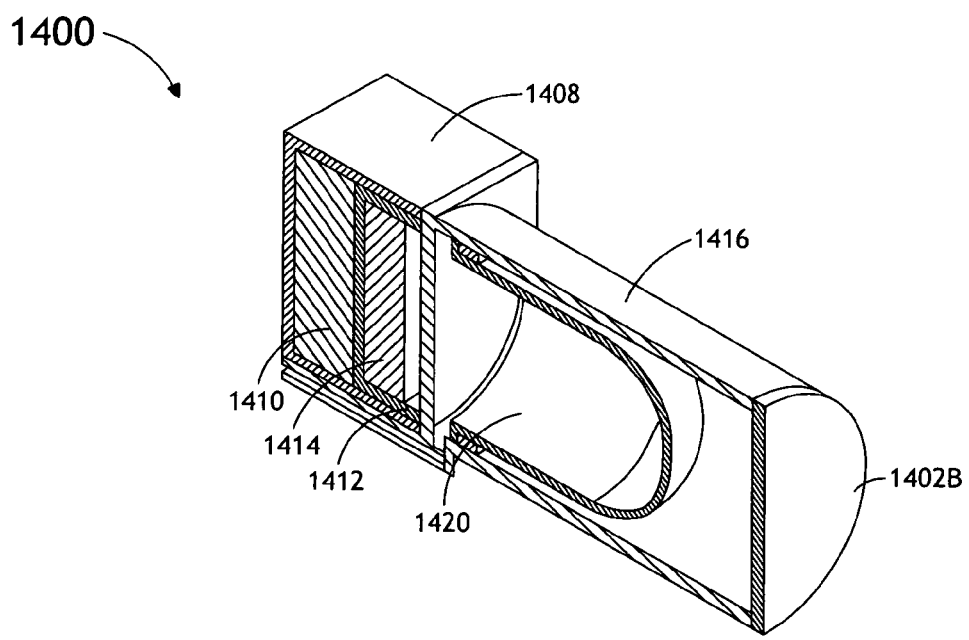

FIGS. 14E and 14F illustrate another embodiment of the variable moderator thickness neutron spectrometer 1400 that includes an inflating diaphragm 1420. The inflatable diaphragm may be configured to control the amount of neutron moderator material 1418 between the aperture and neutron detector 1414, allowing a neutron spectrum to be investigated as illustrated in the foregoing example. However, instead of a moderator piston 1404A, 1404B controlling the moderator material 1418 present in the neutron moderation section 1416, a selected amount of the neutron moderator material 1418 simply fills the flexible diaphragm 1420.

In the present disclosure, the methods disclosed may be implemented as sets of instructions or software readable by a device embodied in a tangible media, such as memory. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

Those having skill in the art will recognize that the state-of-the-art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art wilt appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. An apparatus for determination of one or more free neutron characteristics, comprising:
    one or more neutron detectors, the one or more neutron detectors comprising:
        a plurality of neutron detection devices;
        a plurality of discrete neutron moderating elements, wherein each of the neutron moderating elements is disposed between two or more neutron detection devices, the plurality of neutron detection devices and the plurality of discrete neutron moderating elements disposed along a common axis; and
    a control system communicatively coupled to each of the neutron detection devices, the control system configured to:
        generating a detector response library, wherein the detector response library includes one or more sets of data indicative of a response of the one or more neutron detectors to a known neutron source;
        receive one or more measured neutron response signals from each of the neutron devices, the one or more measured response signals responsive to a detected neutron event; and
        determine one or more characteristics of neutrons emanating from a measured neutron source by comparing the one or more measured neutron response signals to the detector response library.

2. The apparatus of claim 1, wherein at least some of the neutron detection devices comprise:
    a micro-structured semiconductor neutron detection device.

3. The apparatus of claim 1, wherein at least some of the neutron detection devices comprise:
    a coated semiconductor neutron detection device.

4. The apparatus of claim 1, wherein the neutron event comprises:
    a neutron capture event, a neutron-induced fission event, or a neutron scattering event.

5. The apparatus of claim 1, wherein the one or more neutron detectors has a cylindrical shape, a spherical shape, a conical shape, a parallelepiped shape, an ellipsoidal shape, or a hexagonal shape.

6. The apparatus of claim 1, wherein at least some of the discrete moderating elements have at least one of a cylindrical shape and a parallelepiped shape.

7. The apparatus of claim 1, wherein at least a portion of the surface of the one or more neutron detectors is covered with an electromagnetic shield material.

8. The apparatus of claim 1, wherein at least a portion of the surface of the one or more neutron detectors is covered with at least one of a neutron shield and a radiation shield.

9. The apparatus of claim 1, wherein at least some of the neutron detection devices include two or more neutron detection elements.

10. The apparatus of claim 9, wherein the two or more neutron detection elements are distributed according to a geometric pattern.

11. The apparatus of claim 1, wherein at least some of the neutron detection devices are substantially planar.

12. The apparatus of claim 1, wherein at least some of the neutron detection elements are linearly positioned along an orientation axis.

13. The apparatus of claim 1, wherein at least some of the neutron detection elements are nonlinearly positioned along an orientation axis.

14. The apparatus of claim 1, wherein the determined one or more characteristics of neutrons emanating from a measured neutron source comprise:
    at least one of energy, energy spectrum, type of neutron source, direction of neutron emanation, neutron flux, neutron fluence, and neutron dose.

15. An apparatus for determination of one or more free neutron characteristics, comprising:
    one or more neutron detectors, the one or more neutron detectors comprising:
        a plurality of neutron detection devices;
        a plurality of discrete neutron moderating elements, wherein each of the neutron moderating elements is disposed between two or more neutron detection devices, the plurality of neutron detection devices and the plurality of discrete neutron moderating elements disposed along a common axis;
        one or more backscatter blockers disposed in proximity to one or more of the neutron detection devices, the one or more backscatter stoppers configured to inhibit neutron intensity smearing along one or more coordinate axes; and
    a control system communicatively coupled to each of the neutron detection devices, the control system configured to:
        generate a detector response library, wherein the detector response library includes one or more sets of data indicative of a response of the one or more neutron detectors to a known neutron source;
        receive one or more measured neutron response signals from each of the neutron devices, the one or more measured response signals responsive to a detected neutron event; and
        determine one or more characteristics of neutrons emanating from a measured neutron source by comparing the one or more measured neutron response signals to the detector response library.

16. The apparatus of claim 15, wherein at least some of the neutron detection devices comprise:
    a micro-structured semiconductor neutron detection device.

17. The apparatus of claim 15, wherein at least some of the neutron detection devices comprise:
    a coated semiconductor neutron detection device.

18. The apparatus of claim 15, wherein the one or more neutron detectors has a cylindrical shape, a spherical shape, a conical shape, a parallelepiped shape, an ellipsoidal shape, or a hexagonal shape.

19. The apparatus of claim 15, wherein at least some of the discrete moderating elements have at least one of a cylindrical shape and a parallelepiped shape.

20. The apparatus of claim 15, wherein at least a portion of the surface of the one or more neutron detectors is covered with an electromagnetic shield material.

21. The apparatus of claim 15, wherein at least some of the neutron detection devices include two or more neutron detection elements.

22. The apparatus of claim 21, wherein the two or more neutron detection elements are distributed according to a geometric pattern.

23. The apparatus of claim 15, wherein at least some of the neutron detection devices are substantially planar.

24. The apparatus of claim 15, wherein the determined one or more characteristics of neutrons emanating from a measured neutron source comprise:

at least one of energy, energy spectrum, type of neutron source, direction of neutron emanation, neutron flux, neutron fluence, and neutron dose.

\* \* \* \* \*